United States Patent [19]
Kawaguchi

[11] Patent Number: 5,832,527
[45] Date of Patent: Nov. 3, 1998

[54] FILE MANAGEMENT SYSTEM INCORPORATING SOFT LINK DATA TO ACCESS STORED OBJECTS

[75] Inventor: Miyoko Kawaguchi, Kawasaki, Japan

[73] Assignee: Fujitsu Limited, Kawasaki, Japan

[21] Appl. No.: 597,686

[22] Filed: Feb. 6, 1996

Related U.S. Application Data

[63] Continuation of Ser. No. 251,353, May 31, 1994, abandoned.

[30] Foreign Application Priority Data

Sep. 8, 1993 [JP] Japan .................................. 5-223508

[51] Int. Cl.$^6$ ...................................................... G06F 17/30
[52] U.S. Cl. ............................................................ 707/205
[58] Field of Search ................................... 395/601, 616, 395/621; 707/205–200

[56] References Cited

U.S. PATENT DOCUMENTS

| | | | |
|---|---|---|---|
| 4,953,122 | 8/1990 | Williams | 711/4 |
| 5,119,291 | 6/1992 | Flannagan et al. | 711/4 |
| 5,202,982 | 4/1993 | Gramlich et al. | 395/602 |
| 5,239,647 | 8/1993 | Anglin et al. | 395/621 |
| 5,574,898 | 11/1996 | Leblang et al. | 395/601 |

FOREIGN PATENT DOCUMENTS

| | | |
|---|---|---|
| 63-124147 | 5/1988 | Japan . |
| 2-032430 | 2/1990 | Japan . |
| 3-067344 | 3/1991 | Japan . |
| 4-260945 | 9/1992 | Japan . |

OTHER PUBLICATIONS

Kehoe, M. "File When Ready", HP Professional, vol. 7, No. 1, p. 54, Jan 1993.

Sobell, M., A Practice Guide to the UNIX System, Benjamin/Cummings Publishing Co. Inc. pp. 15, 32–33, 66–89, 248–252, 322, 372–375, 454, 507–509,A–38 through A–43, Dec. 1989.

R. Duncan "Design Goals and Implementation of the New High Performance File System" Microsoft Systems Journal, pp. 1–13, Sep. 1989.

*Primary Examiner*—Thomas G. Black
*Assistant Examiner*—Jack M. Choules
*Attorney, Agent, or Firm*—Staas & Halsey

[57] ABSTRACT

A file management system has a disk access unit for converting the relative position of a block in a file system into a physical position and accessing data at the position on a disk. The file management system includes a file entity operation unit, a file system manager access unit, and a file management table access unit. The file entity operation unit updates free block data in the file system when creating and deleting a file entity. The file system manager access unit lets the file entity operation unit work with no regard to the medium structure of a file system manager of the file system. The file management table access unit has an entry operation unit for allocating and releasing file management table entries and an entry access unit for referring to and updating the contents of the file management table entries. The entry access unit has a function of extracting soft link data out of any one of the file management table entries. The file management system allocates no data storage block to the soft link data, to thereby improve the space efficiency of the file system. The file management system refers to the contents of the symbolic link without referring to a data storage area of the file system, to thereby decrease the number of I/O operations during a pathname resolution process by the number of symbolic links contained in a path name to be solved.

13 Claims, 30 Drawing Sheets

△ : DIRECTORY
○ : OTHER FILE
□ : SYMBOLIC LINK

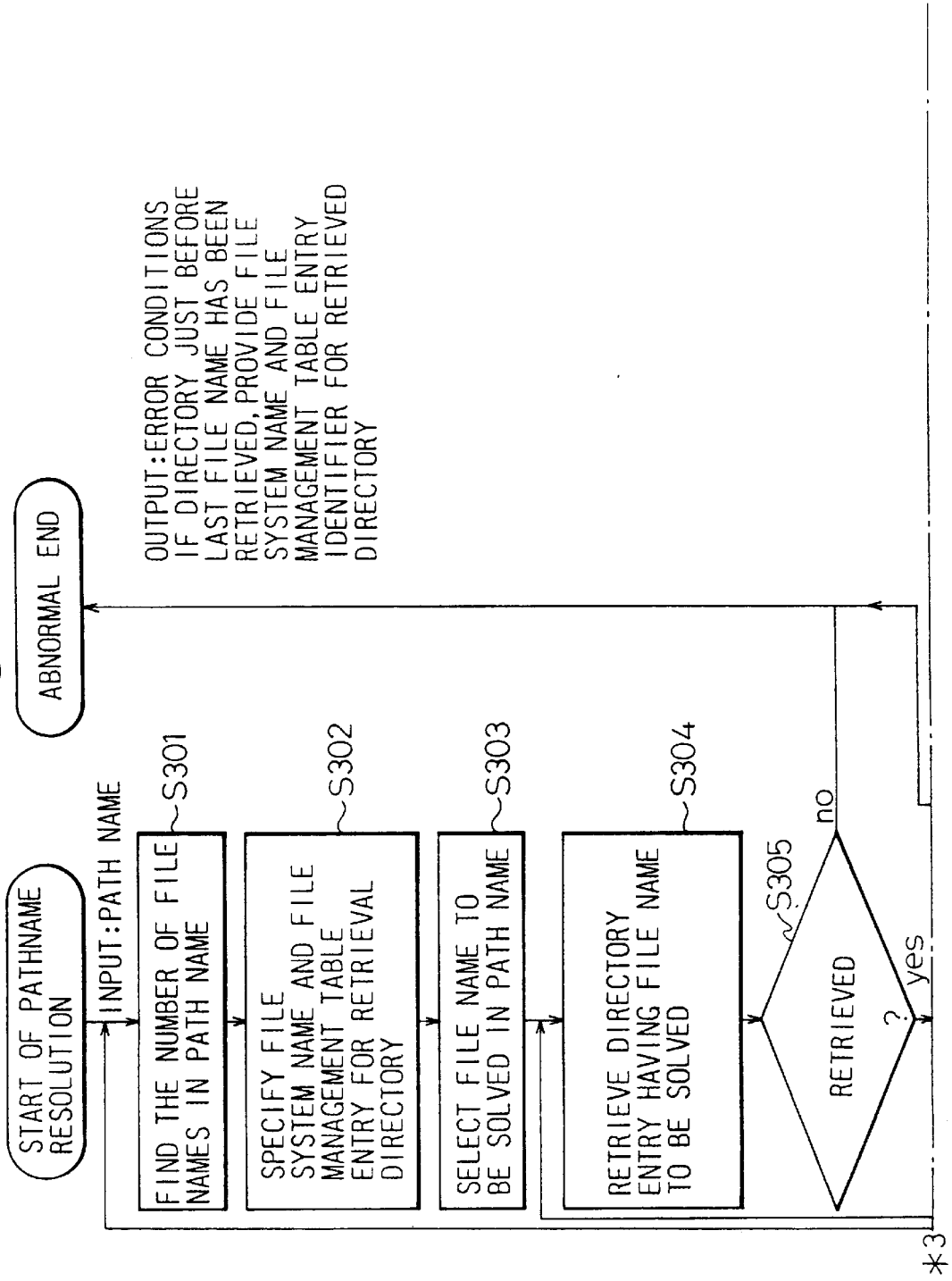

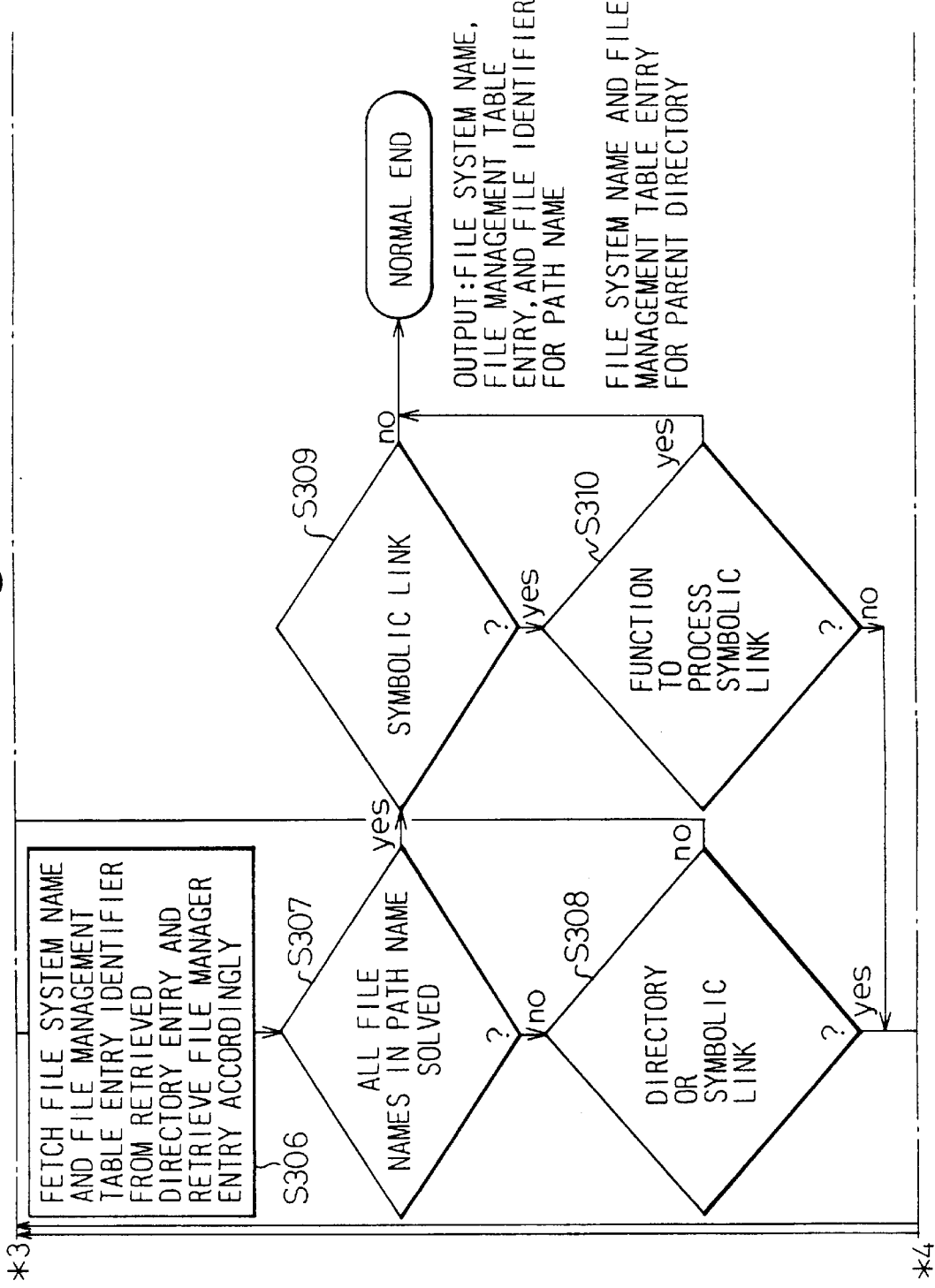

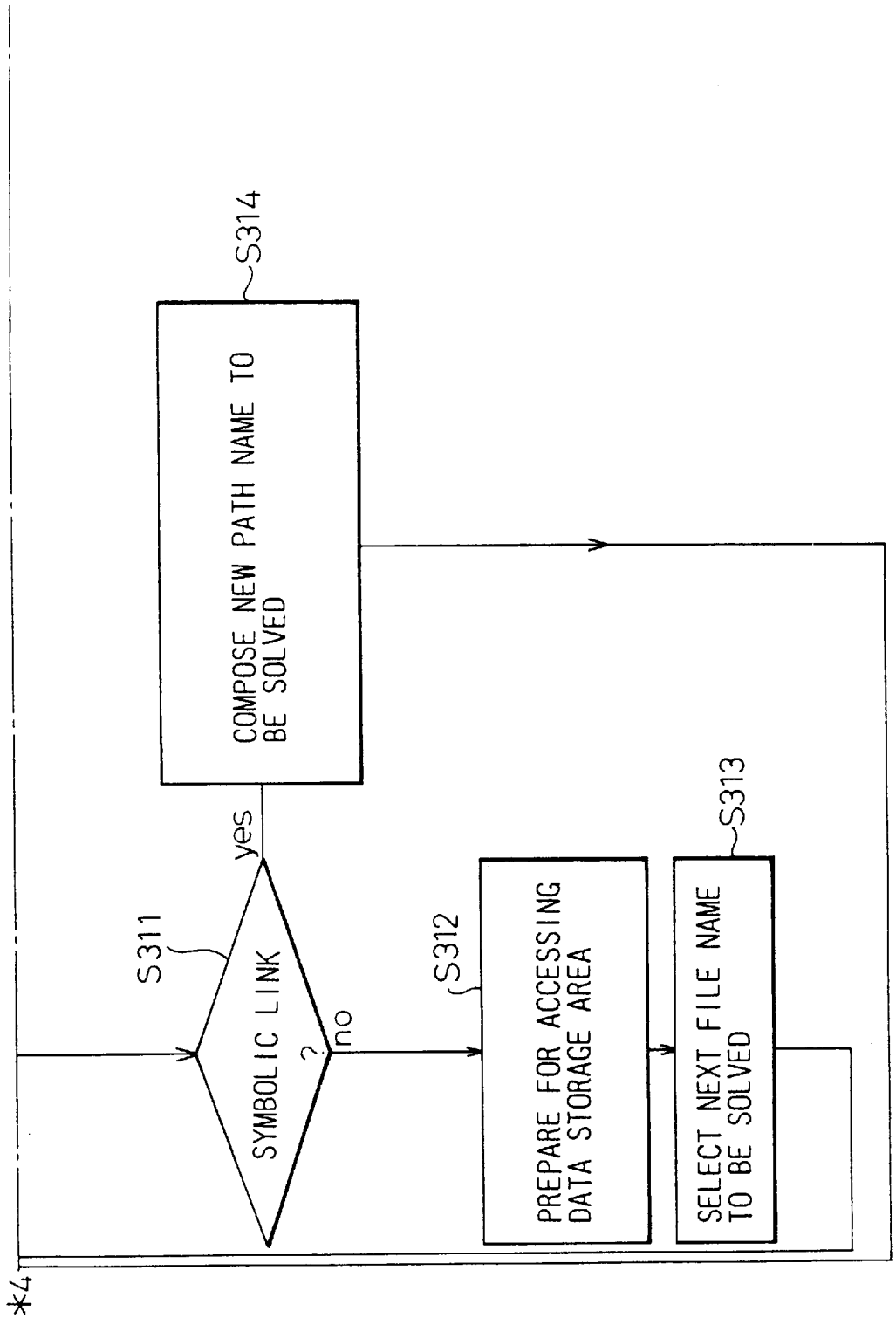

Fig.6A
OTHER THAN SYMBOLIC FILE

| ACCESS AUTHORIZATION AND FILE TYPE |
| --- |
| OWNER IDENTIFIER |
| OWNER GROUP IDENTIFIER |
| LAST REFERENCE TIME |
| LAST UPDATE TIME |
| LAST STATUS CHANGE TIME |
| THE NUMBER OF HARD LINKS |
| DATA QUANTITY |
| THE NUMBER OF ALLOTTED BLOCKS |
| ALLOTTED BLOCK REFERENCE AREA |

Fig.6B
SYMBOLIC LINK

| ACCESS AUTHORIZATION AND FILE TYPE |
| --- |
| OWNER IDENTIFIER |
| OWNER GROUP IDENTIFIER |
| LAST REFERENCE TIME |
| LAST UPDATE TIME |
| LAST STATUS CHANGE TIME |
| THE NUMBER OF HARD LINKS |
| DATA QUANTITY |
| THE NUMBER OF ALLOTTED BLOCKS |
| SOFT LINK DATA |

} 512 BYTES

Fig.7A
OTHER THAN SYMBOLIC LINK

| ENTRY LENGTH |
| ENTRY IDENTIFIER |
| ACCESS AUTHORIZATION AND FILE TYPE |
| OWNER IDENTIFIER |
| OWNER GROUP IDENTIFIER |
| LAST REFERENCE TIME |
| LAST UPDATE TIME |
| LAST STATUS CHANGE TIME |
| THE NUMBER OF HARD LINKS |
| DATA QUANTITY |
| THE NUMBER OF ALLOTTED BLOCKS |
| ALLOTTED BLOCK REFERENCE AREA |

Fig.7B
SYMBOLIC LINK

| ENTRY LENGTH |
| ENTRY IDENTIFIER |
| ACCESS AUTHORIZATION AND FILE TYPE |
| OWNER IDENTIFIER |
| OWNER GROUP IDENTIFIER |
| LAST REFERENCE TIME |
| LAST UPDATE TIME |
| LAST STATUS CHANGE TIME |
| THE NUMBER OF HARD LINKS |
| DATA QUANTITY |
| THE NUMBER OF ALLOTTED BLOCKS |
| PATH NAME LENGTH |
| PATH NAME   512 BYTES |

{ SOFT LINK DATA (PATH NAME LENGTH and PATH NAME)

PM:PROCESSOR MODULE

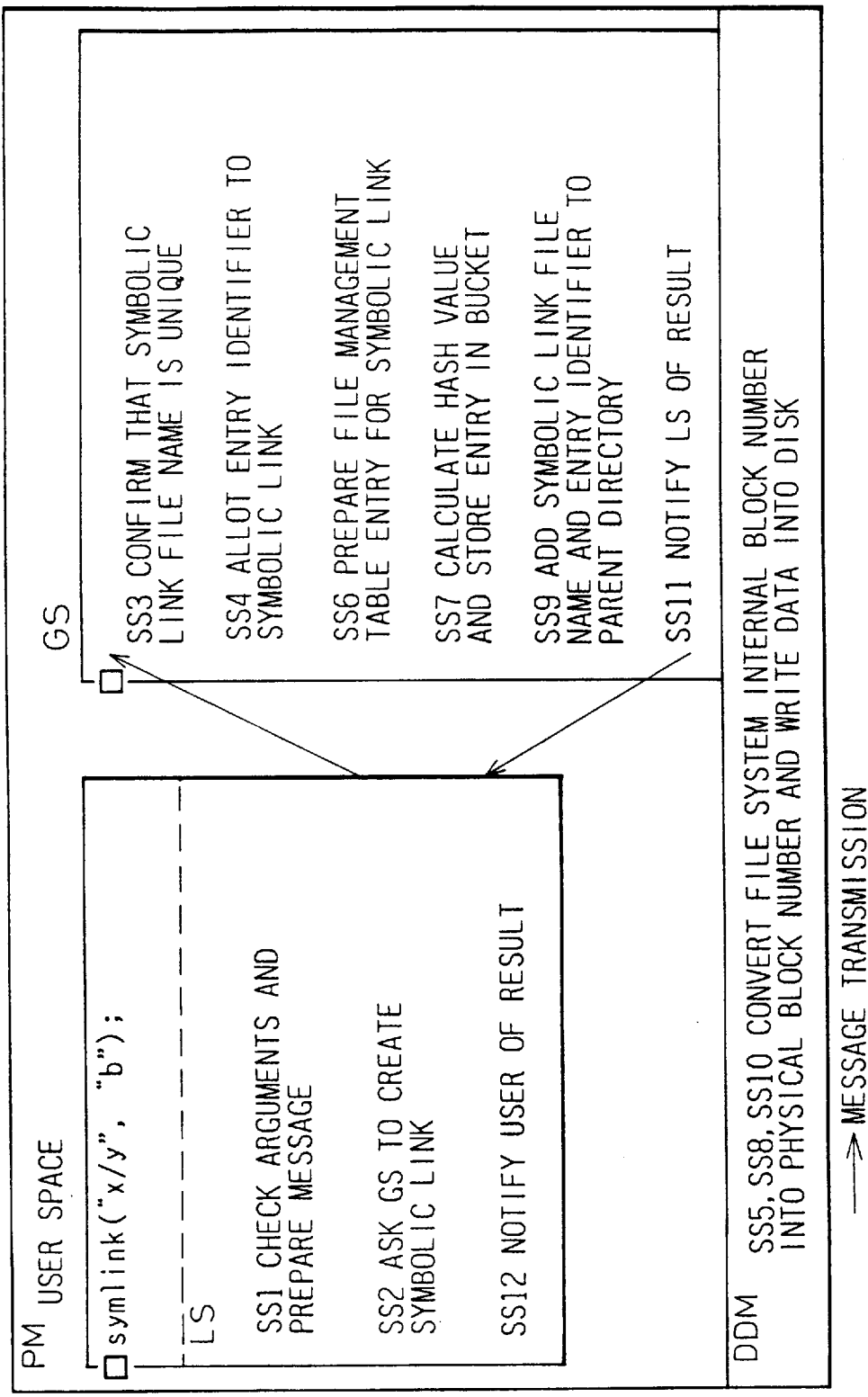

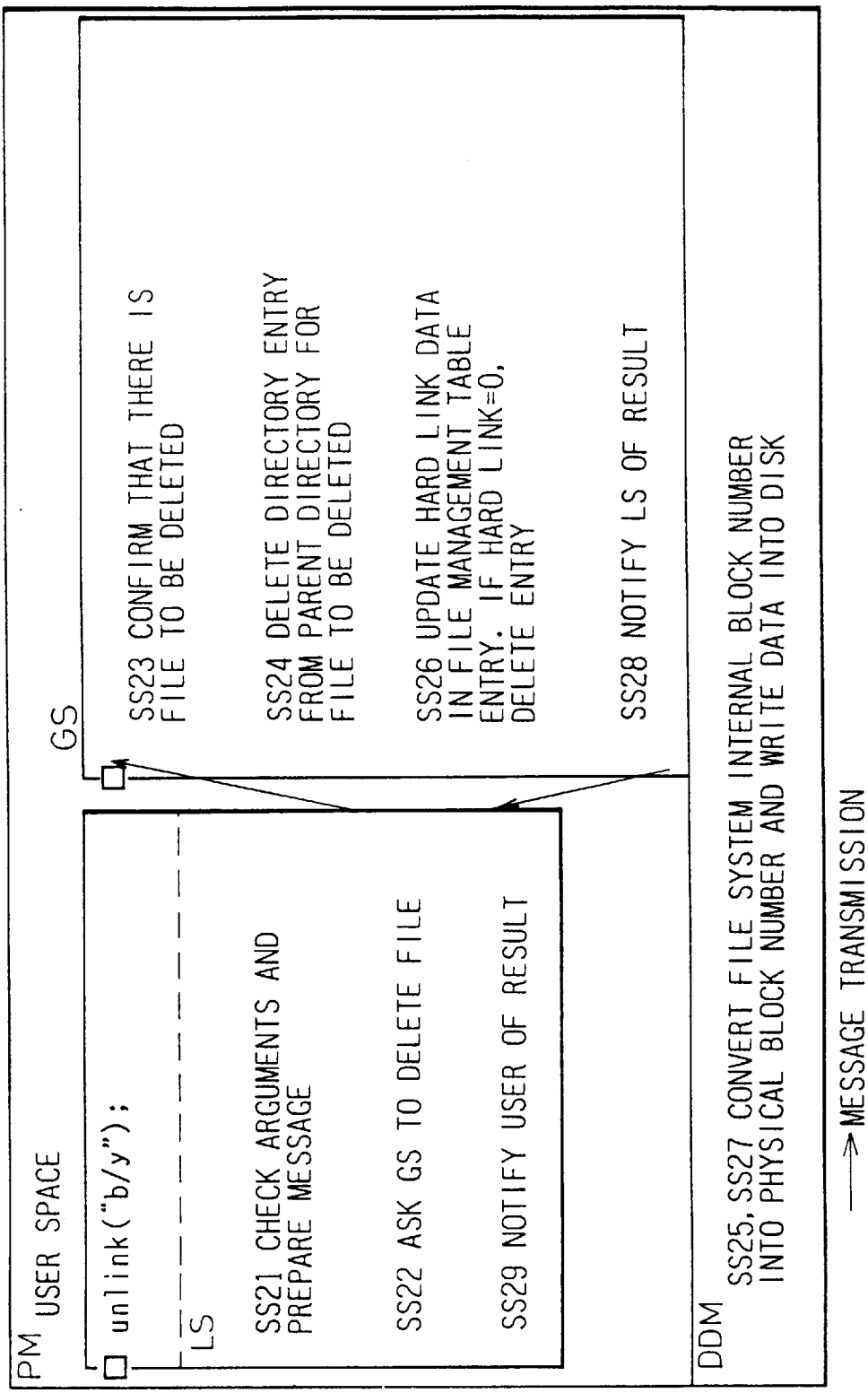

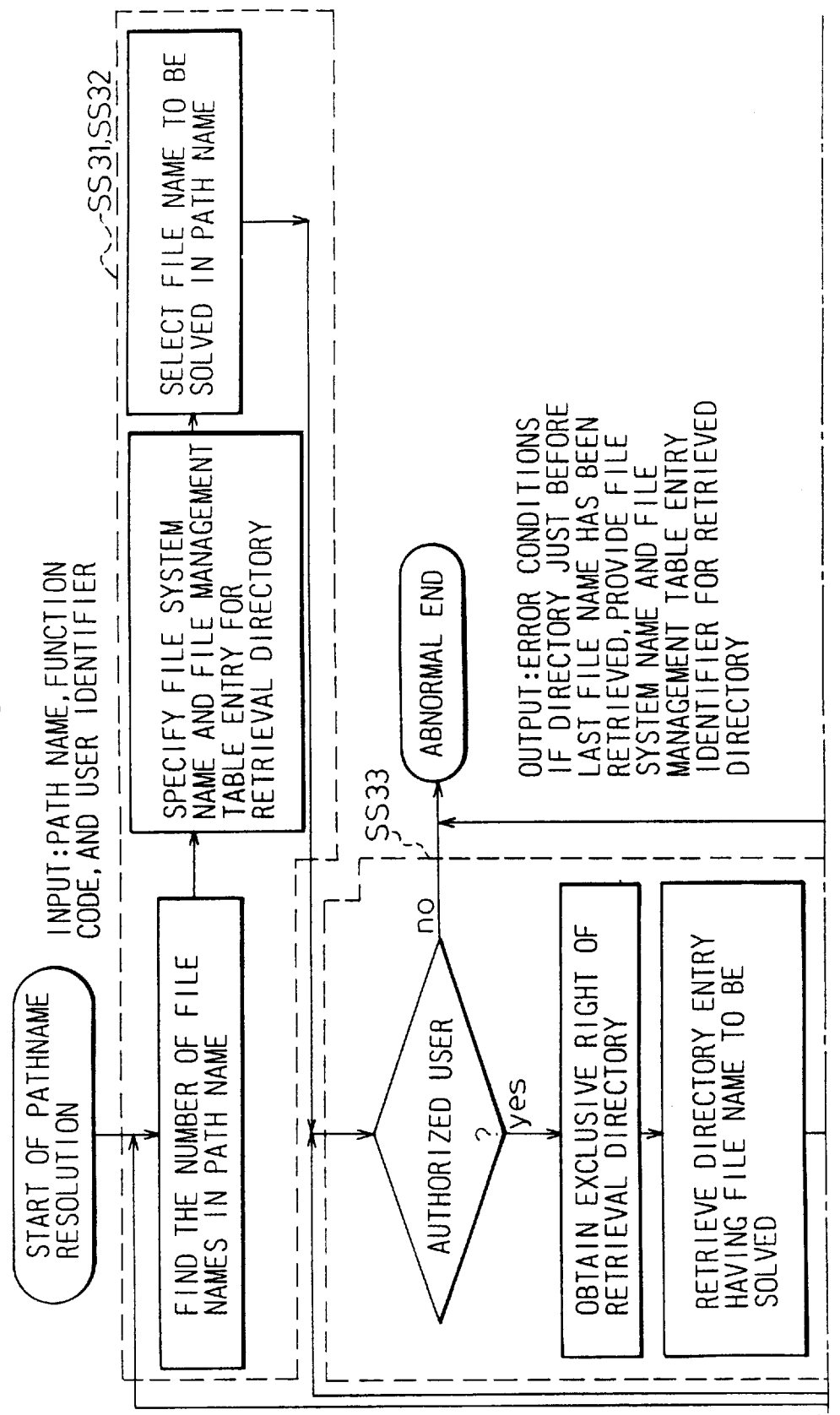

Fig. 22

| | BEFORE | AFTER |
|---|---|---|
| I/O AT CREATION | — | REDUCTION IN I/O OPERATIONS n+2 WHEN ADDING DIRECTORY ENTRY, WHERE n IS THE NUMBER OF REGULAR FILES |
| OPEN/SWITCH | — | REDUCTION IN I/O OPERATIONS ONE WHEN READING DIRECTOR DATA AREA |
| DIRECTORY DISK SPACE | FILE MANAGEMENT TABLE +DATA AREA (12 KILOBYTES) | PREVIOUS FILE MANAGEMENT TABLE+(n+2)x48 BYTES (ABOUT) 48 BYTES=AVERAGE FILE NAME + NAME ATTRIBUTE LENGTH |

FILE MANAGEMENT SYSTEM INCORPORATING SOFT LINK DATA TO ACCESS STORED OBJECTS

This application is a continuation of application Ser. No. 08/251,353, filed May 31, 1994, now abandoned.

BACKGROUND OF THE INVENTION

1. Field of the Invention

The present invention relates to a file management system, and particularly, to a file management system capable of creating symbolic links for specifying files in a computer system.

2. Description of the Related Art

A file management system manages file systems each composed of, for example, a file system manager for managing the name, size, conditions, and free block data of the file system, a file management table for managing the attributes and allocation data of files, and a data storage area for storing the contents of the files.

The file management system may create a symbolic link in a file system by allocating a file management table entry and at least a block (an I/O unit with respect to a disk) of the data storage area to the symbolic link, similar to creating a regular file. The file management table entry points the data storage block allocated to the symbolic link. The symbolic link contains a path name (soft link data), which is stored in the allocated data block. A file name and a file management table entry identifier for the symbolic link are registered in a proper directory to access the symbolic link.

In this way, the conventional file management system stores the contents of each symbolic link in a data storage block. The contents of each symbolic link are usually a path name composed of several tens of bytes, and therefore, storing the symbolic link contents deteriorates the space efficiency of the data storage area.

A pathname resolution process including the symbolic link requires a large number of I/O operations compared with that of a regular file (not including the symbolic link), to deteriorate the performance of the file management system. To narrow the gap between the pathname resolution including the symbolic link and the pathname resolution not including the symbolic link (regular file) in connection with the pathname resolution, the number of I/O operations required by the symbolic link must be reduced.

SUMMARY OF THE INVENTION

In view of the foregoing comments, it is an object to solve the above-listed problems.

An object of the present invention is to provide a file management system that improves disk space efficiency and simplifies file management.

Still another object of the present invention is to provide a file management system that incorporates symbolic data to access stored object.

According to the present invention, there is provided a file management system comprising a disk access unit for converting the relative position of a block in a file system into a physical position and accessing data at the physical position in a disk; a file entity operation unit for updating free block data in the file system when creating and deleting a file entity; a file system manager access unit for letting the file entity operation unit access a file system manager of the file system without knowing the data structure of the file system manager; and a file management table access unit having an entry operation unit for allocating and releasing file management table entries and an entry access unit for referring to and updating the contents of each of the file management table entries, the entry access unit having a function of extracting soft link data out of any one of the file management table entries.

The file management system may further comprise a higher unit; the entry access unit may be directly or indirectly used by the higher unit, to provide the contents of a file management table entry corresponding to an entry identifier specified by the higher unit irrelevant to the data structure of the file management table entry, data irrelevant to the data structure of the file management table entries may be received, the received data according to the data structure of the file management table entries may be processed, and one of the file management table entries according to the processed data may be updated; and the entry operation unit may be used by the file entity operation unit, to prepare a file management table entry and notify the higher unit of an entry identifier unique to the prepared file management table entry, as well as releasing a file management table entry corresponding to an entry identifier provided by the higher unit.

The higher unit may comprise an application program interface, pathname resolution unit, and hard link data operation unit; and the entry access unit may be directly or indirectly used by the application program interface, the pathname resolution unit, and the hard link data operation unit. The file management system may further comprise a data storage area access unit having a directory access unit for referring to, updating, deleting, and adding directory entries and a regular file access unit for referring to and updating data of regular files; the hard link data operation unit may use the directory access unit and the entry access unit, to refer to, update, add, and delete hard link data while maintaining the correspondence of the hard link data in a directory and a file management table entry; the pathname resolution unit may use the directory access unit and the entry access unit, to specify a file according to a given path name, hard link data, and soft link data; and the file entity operation unit may allocate and release file management table entries while correctly maintaining a relationship between file system free block data in the file system manager and allocation data in the file manager.

The file system manager of each file system may hold data for indicating whether the file system is new or old, and the file management system may have logic for determining a position to store soft link data according to the data indicating whether the file system is new or old, to thereby support old and new media.

Further, according to the present invention, there is also provided a file management method comprising the steps of storing soft link data in a file management table of a file system; and managing a corresponding file according to the soft link data.

The soft link data may be a path name that is the contents of a symbolic link serving as unit to specify a file in the file system. The file management method may be applied to manage data of files. The file management method may be applied to manage circulation files.

BRIEF DESCRIPTION OF THE DRAWINGS

The present invention will be more clearly understood from the description of the preferred embodiments as set forth below with reference to the accompanying drawings, at which:

FIGS. 5A to 5C are flowcharts showing pathname resolution steps according to the symbolic link process;

FIGS. 6A and 6B show file management table entries of a fixed length data structure managed by the file management system of the present invention;

FIGS. 7A and 7B show file management table entries of a variable length data structure managed by the file management system of the present invention;

FIG. 13 shows steps of creating a symbolic link according to the file management system of the present invention;

FIG. 14 shows steps of deleting a symbolic link according to the file management system of the present invention;

FIGS. 17A to 17C are flowcharts showing pathname resolution steps according to the symbolic link process;

FIG. 22 shows the effect of the file management system of the present invention when storing logs of file systems.

DETAILED DESCRIPTION OF THE PREFERRED EMBODIMENTS

A symbolic link will now be briefly explained.

A unique file name is allocated to a file in a directory. Each directory is a file for managing many file names. A file hierarchy is composed of directories and other files. Any file name may be managed by a plurality of directories. Namely, any file may be specified with a plurality of path names each uniquely identifying the file. The file hierarchy may include, according to UNIX (registered trade name) specifications, directory files, regular files, block special files, character special files, FIFO special files, and symbolic links.

Figure 1:
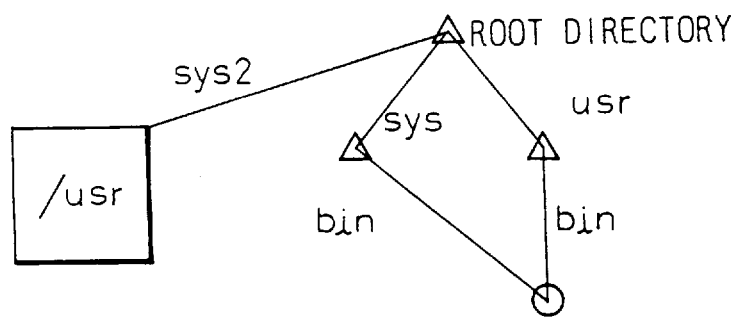
FIG. 1 illustrates a symbolic link managed by a file management system according to the present invention.

FIG. 1 shows an example of a symbolic link managed by a file management system according to the present invention. A file represented with a circle has a file name "bin." The file "bin" is controlled by two directories "/sys" and "/usr." Accordingly, the file "bin" is specifiable by any one of two path names "/sys/bin" and "/usr/bin."

To control files under a directory and specify any file with a path name, the directory must control a relationship between the name and entity of each file. A symbolic link may be prepared for any file. The symbolic link is a file and contains a path name to specify the file for which the symbolic link has been prepared.

In FIG. 1, a square represents a symbolic link. Characters in the square are the contents, i.e., a path name of the symbolic link. When a path name of "/sys2/bin" is entered, the system recognizes that the "/sys2" represents the symbolic link, excludes the path name of the symbolic link from the entered path name to provide "/bin," and adds the contents "/usr" of the symbolic link thereto to provide a path name of "/usr/bin" to specify the file "bin." The file "bin" of FIG. 1 is specifiable with any one of the three path names "/usr/bin," "/sys/bin," and "sys2/bin."

When a relationship between the name and entity of a file is added to a directory, a relationship called a hard link (or a link) is established between the directory and the file. On the other hand, a relationship between the contents of a symbolic link and a file is called a soft link (or a symbolic link). The contents of a symbolic link are determined by a user when creating a file, and there is no means to change the contents.

Each file system is composed of a file system manager, a file management table, and a data storage area. The file system manager manages the name, size, conditions, and free block data of the file system.

The file management table manages the attribute and allocation data of each file. The file attribute data includes a file type, the number of hard links, security data (such as an owner, an owner group, and access permission), and data quantity. The data storage area stores the contents of the files.

The file management system may create a symbolic link in any file system by allocating a file management table entry and at least a block (an I/O unit with respect to a disk) of the data storage area to the symbolic link, similar to creating a regular file. The file management table entry points to the allocated data storage block. The symbolic link contains a path name, which is stored in the allocated data storage block. A combination of a file name of the symbolic link and an identifier indicating the file management table entry is called a directory entry, which is registered in a proper directory so that the symbolic link can be referred to.

To specify a file with a path name, the following steps 1 to 5 are carried out:

(1) A retrieval directory is specified. If a head character of the path name is "/," the retrieval directory is a root directory, and if not, it is a current working directory.

(2) The following steps 3 to 5 are repeated for i=1 to N, where N represents the number of file names contained in the path name.

(3) The "i"th file name in the path name is used as a key to retrieve a directory entry in the retrieval directory.

(4) A file management table entry identifier in the retrieved directory entry is used as a key to retrieve a file management table entry.

(5) In the retrieved file management table entry, file attribute data are referred to. If the file managed by the retrieved entry is a directory and if i=N, the pathname resolution process ends. If the file is a directory and if i<N, the directory specified by the file management table entry is set as a retrieval directory, i is incremented by one to select the next file name in the path name, and the step 3 is repeated.

If the file is a symbolic link with i=N and if the symbolic link itself is an object to be processed (for example, deleted), the pathname resolution process ends. If the symbolic link is not the object to be processed, a data storage block allocated to the symbolic link is located according to allocation data in the file management table entry, to refer to the contents of the symbolic link. The first to "i"th file names are removed from the path name, and the remnant is added to the contents of the symbolic link, to provide a path name, which is again processed from the step 1.

If the file is not a directory nor a symbolic link and if i=N, the pathname resolution process ends. If the file is not a directory nor a symbolic link and if i<N, it is notified that the specified file has not been found.

Storing the contents of a symbolic link in the data storage area has some problems. For example, contents of a symbolic link is a path name, which is usually composed of several tens of bytes. A minimum allocation unit of the data storage area is equal to an I/O block. According to some I/O architecture, the block is made of several thousands of bytes. Allocating such a large block to a small symbolic link deteriorates the space efficiency of the data storage area.

As mentioned above, a path name involving a symbolic link needs more I/O operations during the pathname resolution process compared with a path name involving no symbolic link, to drastically deteriorate the performance of the system. To narrow the gap between the path names with and without the symbolic link during the pathname resolution process, the number of I/O operations required by the symbolic link containing path name must be reduced.

A file management system according to an embodiment of the present invention will be explained with reference to the drawings.

Figure 2:
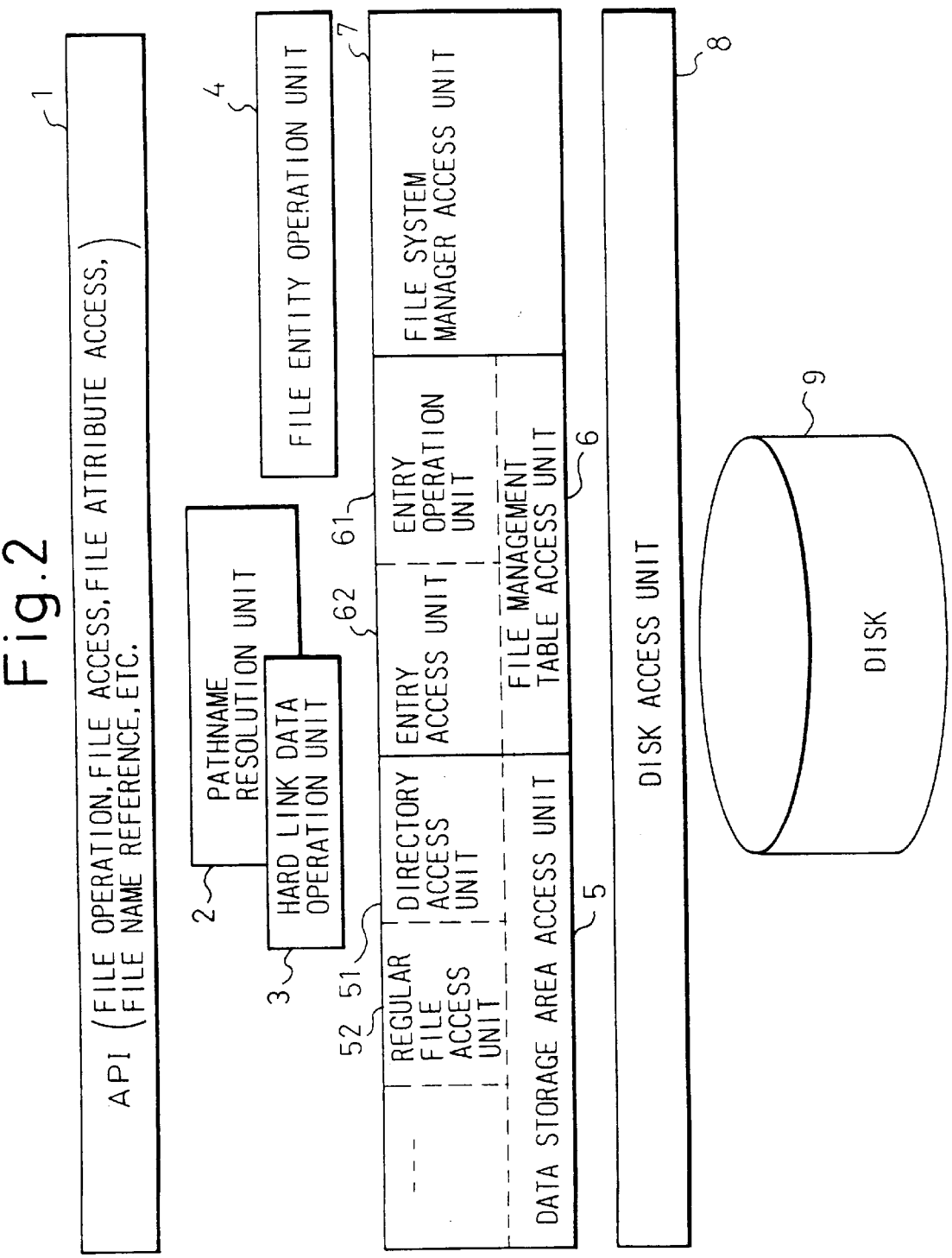
FIG. 2 is a block diagram showing a file management system according to an embodiment of the present invention.

FIG. 2 is a block diagram showing the file management system. The system includes an application program interface (API) 1, a pathname resolution unit 2, a hard link data operation unit 3, a file entity operation unit 4, a data storage area access unit 5, a file management table access unit 6, a file system manager access unit 7, a disk access unit 8, and a disk 9.

A file system managed by the file management system is an array of blocks and is composed of a file system manager, a file management table, and a data storage area. The file management system informs the disk access unit 8 of the relative position of a block in the file system. The disk access unit 8 converts the relative position into a physical position and accesses the position of the disk 9 for data.

The file system manager access unit 7 is used by the file entity operation unit 4 to update free block data in the file system when creating or deleting a file entity. The file system manager access unit 7 lets the file entity operation unit 4 work with no regard to the medium structure of the file system manager of the file system.

The file management table access unit 6 has an entry operation unit 61 for allocating and releasing file management table entries and an entry access unit 62 for referring to and updating the contents of the entries. The structure of the file management table is dependent on the file system.

For example, the file system may employ fixed length entries or variable length entries, the entries being arranged in an array or a hash structure. Irrelevant to the structure of the file management table, the file management table access unit 6 provides an interface for the file manager.

The file entity operation unit 4 employs the entry operation unit 61 to allocate or release entries. When an entry is allocated, the unit 4 notifies a higher unit of an entry identifier that is unique to the entry. The unit 4 releases an entry according to an entry identifier provided by the higher unit.

The entry access unit 62 is directly or indirectly used by the pathname resolution unit 2, hard link data operation unit 3, and other units that use files through the API 1. Responding to an entry identifier provided by any higher unit, the entry access unit 62 notifies the higher unit of the contents of an entry corresponding to the entry identifier with no regard to the data structure of the entry. The entry access unit 62 receives data without knowing the data structure of the file management table entry, processes the data according to the data structure of the entry, and updates the entry according to the data.

According to the embodiment of FIG. 2, the entry access unit 62 has a function of extracting soft link data out of any entry. The file system manager may have data such as a file system name and a version to show whether the file system is new or old. In this case, new and old file systems are easily supported according to a logic that determines the storing position of soft link data according to whether the file system is new or old. It is not so easy to support new and old file systems having no such data for distinguishing new and old, but they may be supported if the data structure of the entries allows the tagging of age.

A technique of supporting the new and old file systems will now be explained.

If the file management table of the old file system employs fixed length entries, the file management table of the new file system employs the same data structure, and in a file management table entry for a symbolic link, uses a section for data storage allocation data or a reserved section as a section for storing soft link data. Data such as the number of allocated blocks indicating that no data storage block is allocated must be left as it is. If a symbolic link is given and if no data storage block is allotted to the symbolic link, i.e., if the number of allocated data storage blocks is cleared to indicate that there is no allocated data storage block, soft link data related to the symbolic link are picked out from a file management table entry. If any data storage block is allocated to the symbolic link, the soft link data are extracted from the allocated data storage block. When creating a symbolic link, it is created as a new medium. In this way, it is possible to support the new and old file systems with entries of the new and old data structures.

The data storage area access unit 5 has a directory access unit 51 and a regular file access unit 52. The directory access unit 51 refers to, updates, deletes, and adds directory entries in directories. The regular file access unit 52 refers to and updates data in regular files.

The hard link data operation unit 3 employs the directory access unit 51 of the data storage area access unit 5 and the entry access unit 61 of the file management table access unit 6, to refer to, update, add, and delete hard link data while maintaining the correctness of hard link data between directories and file management table entries. The pathname resolution unit 2 employs the directory access unit 51 of the data storage area access unit 5 and the entry access unit 62 of the file management table access unit 6, to refer to hard link data and soft link data and specify a file according to a given path name.

The file entity operation unit 4 allocates and releases file management table entries while maintaining the correspondence between free space data in the file system manager and storage area allocation data in the file management table.

To improve operation speed, the file system manager access unit 7, file management table access unit 6, and data storage area access unit 5 may each have a function of caching part of a medium into a memory. In this case, no higher unit is required to determine whether data in the memory must be accessed or the medium must be accessed through the disk access unit 8. Namely, the units 7, 6, and 5 handle the data where it exists.

Figure 3A:
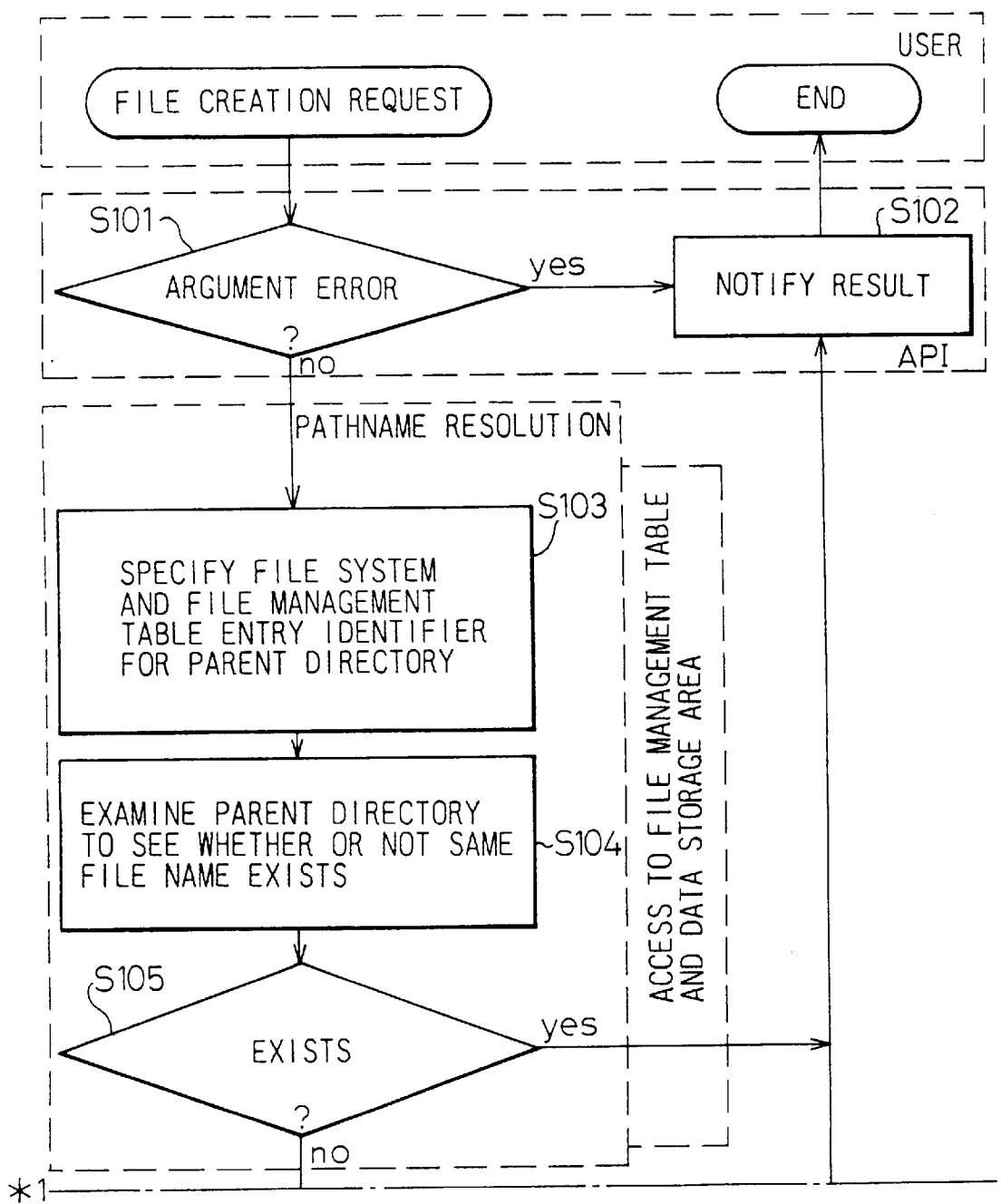
FIGS. 3A and 3B are flowcharts showing steps of creating a file according to a symbolic link process achieved by the file management system of the present invention.
Figure 3B:
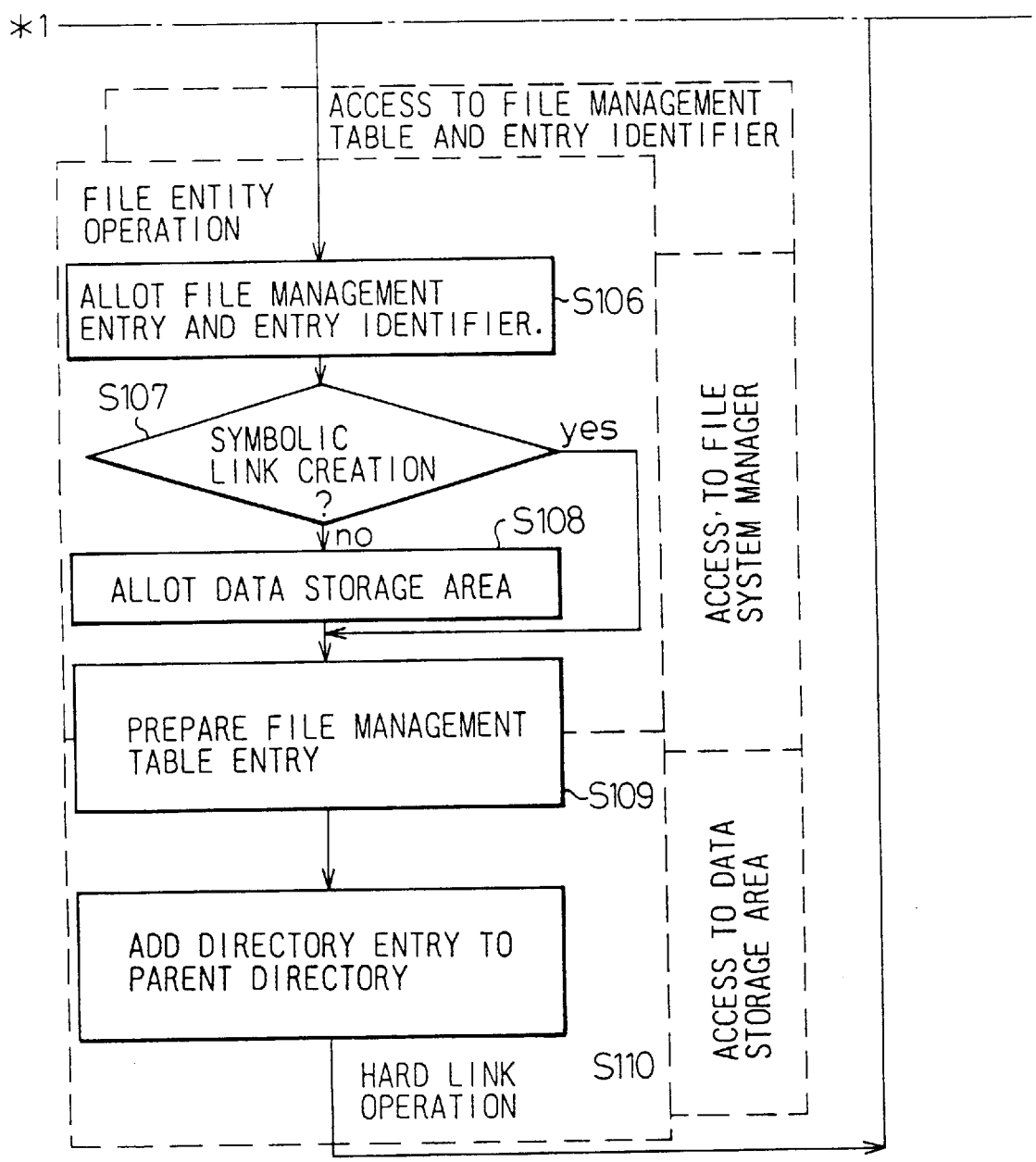
Figure 4A:
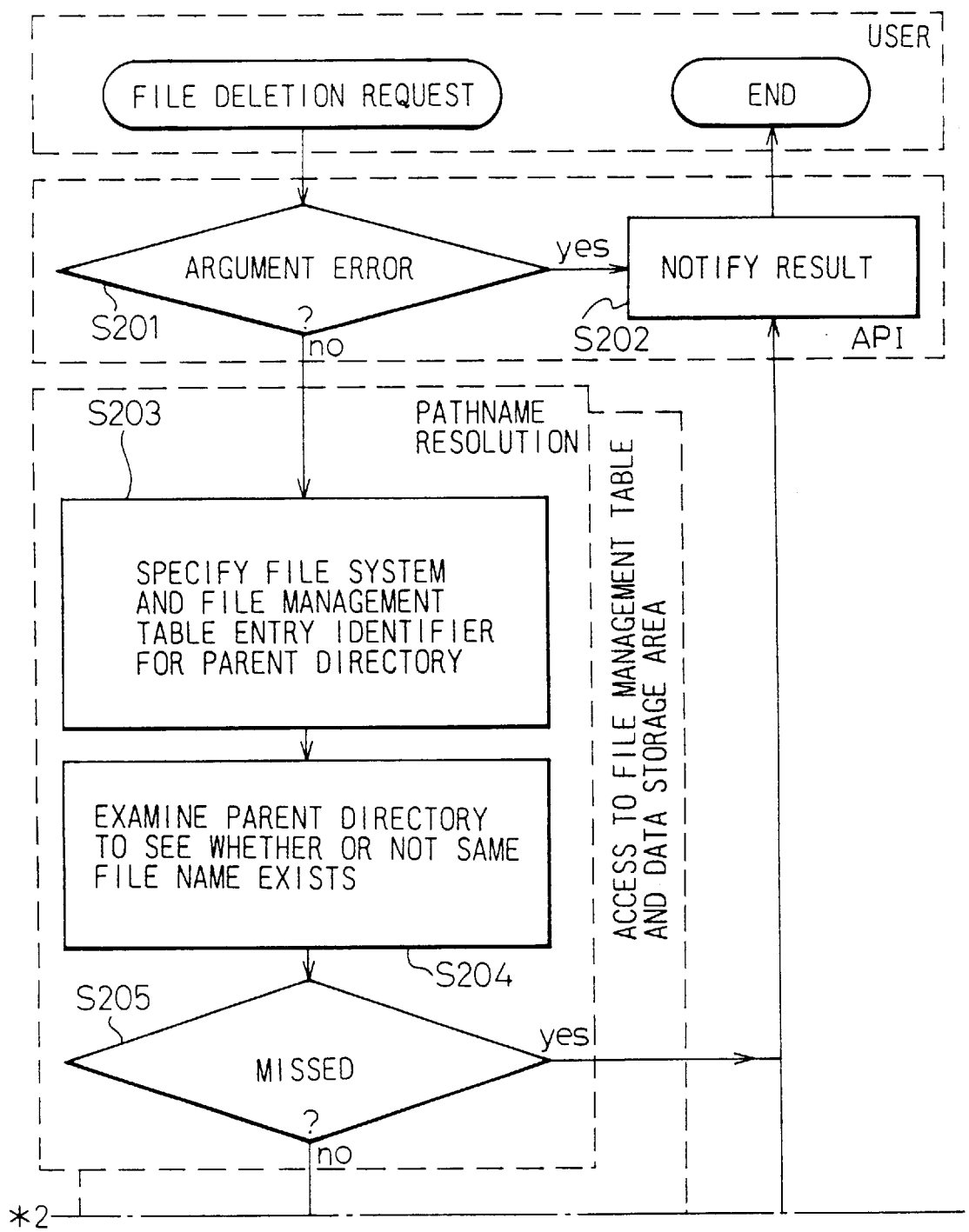
FIGS. 4A and 4B are flowcharts showing steps of deleting a file according to the symbolic link process.
Figure 4B:
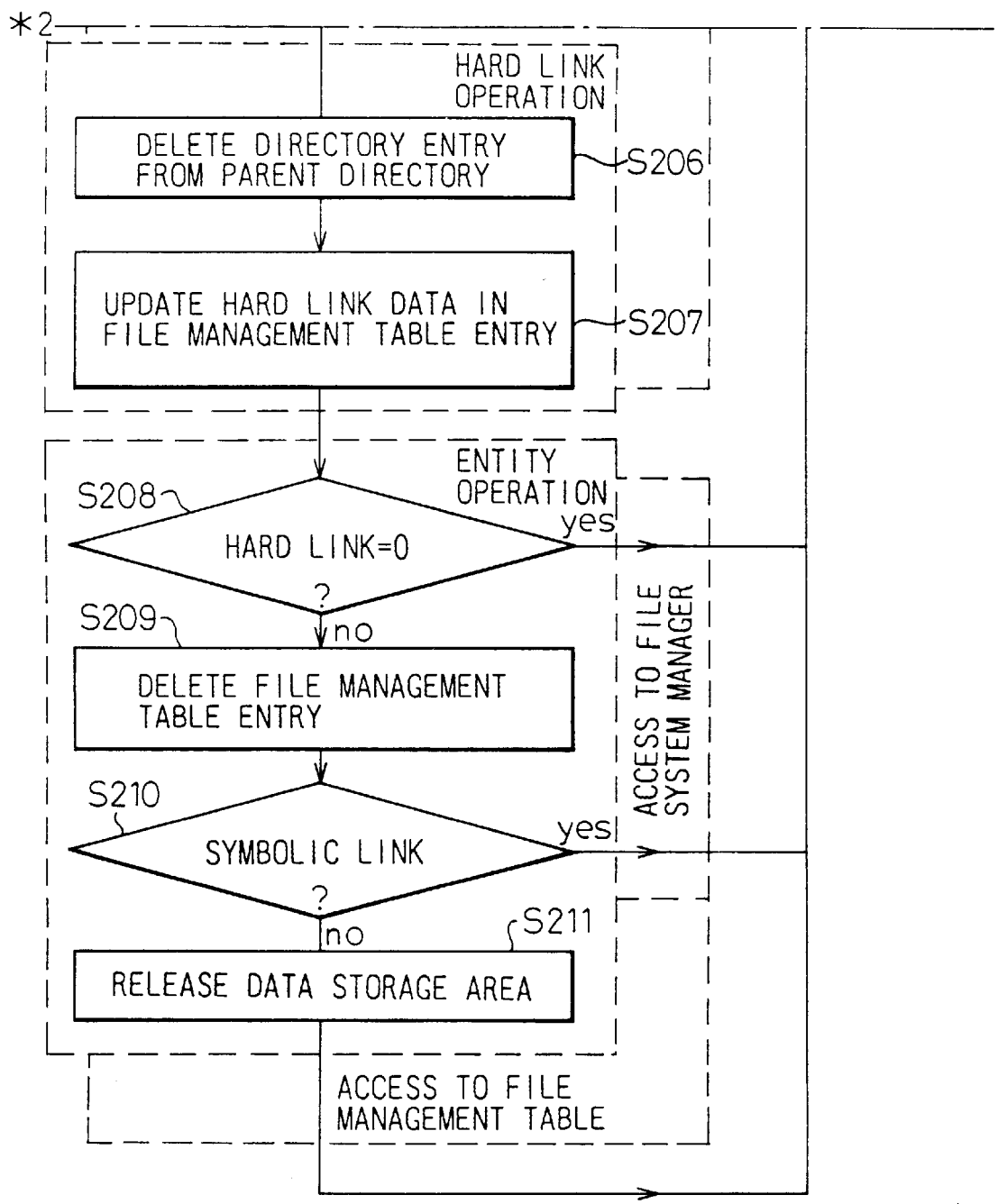

FIGS. 3A and 3B are flow charts showing steps of creating a file according to a symbolic link process achieved by the file management system of the present invention. FIGS. 4A and 4B are flowcharts showing steps of deleting a file according to the symbolic link process, and FIGS. 5A to 5C are flowcharts showing pathname resolution steps according to the same. The steps of creating and deleting a file of FIGS. 3A, 3B, 4A, and 4B clearly show differences from a conventional file creation process.

Referring now to FIGS. 3A and 3B, a request to create a file is issued, and step S101 determines whether or not there is an error in arguments of a given path name representing a file to be created. If there is an error, step S102 notifies a process result according to external specifications and terminates the flow. If no error is found in the step S101, step S103 specifies, for each element in the path name, a file system where a parent directory exists and a file management table entry identifier representing the parent directory, according to hard link data in a file management table entry and directory entries in a file system where the element exists. Step S104 refers to the data storage area of the parent directory and examines whether or not there is a directory entry containing a file name that is equal to the file name to be created. Step S105 determines whether or not the same file name has been found in any directory entry. If it has been found, the step S102 is carried out, and if not, step S106 is carried out.

The step S106 allocates a file management table entry identifier and a file management table entry to the file to be created in the same file system as the parent directory. Step S107 determines whether or not it is the creation of a symbolic link. If it is the creation of the symbolic link, the flow jumps to step S109, and if not, step S108 is carried out. The step S108 allocates data storage blocks to the file. The step S109 prepares the file management table entry. Step S110 adds a directory entry, i.e., a combination of the file system name, file management table entry identifier, and file name of the created file to the parent directory. The step S102 is carried out to end the file creation process.

Referring now to FIGS. 4A and 4B, a file deletion request is issued to start file deletion steps. Step S201 determines whether or not there is an error in arguments of a given path name representing a file to be deleted. If there is an error, step S202 notifies a process result according to external specifications, and the process ends. If there is no error, step S203 specifies, for each element in the path name, a file system where a parent directory exits and a file management table entry identifier representing the parent directory, according to hard link data in a file management table entry and directory entries in a file system where the element exists. Step S204 refers to the data storage area of the parent directory, to examine whether or not there is a directory entry having the file name to be deleted. Step S205 determines whether or not the same file name has been found. If there is no directory entry having the same file name, step S202 is carried out. If there is the directory entry containing the same file name, step S206 is carried out.

The step S206 deletes the directory entry from the parent directory. Step S207 retrieves a file management table entry corresponding to the deleted file in the file system and updates hard link data in the file management table entry. Step S208 determines whether or not the number of hard links is zero. If it is zero, the step S202 is carried out, and if it is not zero, step S209 deletes the file management table entry. Step S210 determines whether or not the file to be deleted is a symbolic link. If it is the symbolic link, the step S202 is carried out. If it is not the symbolic link, step S211 releases a corresponding data storage area, and the step S202 is carried out. The step S202 notifies a process result according to external specifications and terminates the process.

Referring now to FIGS. 5A to 5C, a path name is entered to start a pathname resolution process. Step S301 finds the number of file names in the path name. Step S302 specifies the name of a file system containing a retrieval directory and a file management table entry, thereby preparing for accessing a data storage area. Step S303 selects a file name to be solved in the path name. Step S304 accesses the data storage area of the retrieval directory, to retrieve a directory entry containing the same file name as the file name to be solved.

Step S305 determines whether or not the directory containing the same file name has been retrieved. If the directory has been retrieved, step S306 is carried out, and if not, the flow goes to an abnormal end. The abnormal end provides error conditions. In this case, if a directory just before the last file name in the given path name has been retrieved, the name of a file system where the retrieved directory exists and the file management table entry identifier of the retrieved directory are provided.

The step S306 extracts a file system name and a file management table entry identifier out of the retrieved directory entry and finds the file management table entry in the file system. Step S307 determines whether or not all file names in the path name have been solved. If all file names have been solved, step S309 is carried out, and if not, step S308 is carried out. The step S309 determines whether or not the file corresponding to the file management table entry is a symbolic link. If it is the symbolic link, step S310 is carried out, and if not, the flow goes to a normal end. The step S310 determines whether or not the symbolic link is an object to be processed. If it is the object to be processed, the flow goes to the normal end, and if not, step S311 is carried out. The normal end provides the file system name, file management table entry, and file type of the file specified by the entered path name, as well as the file system name and file management table entry of the parent directory.

The step S308 determines whether the file corresponding to the file management table entry is a directory or a symbolic link. If it is one of the directory and symbolic link, step S311 is carried out, and if not, the process goes to the abnormal end. The step S311 determines whether or not the file corresponding to the file management table entry is a symbolic link. If it is the symbolic link, step S314 picks out a path name in a soft link data section in the file manage entry, combines the same with the remnant of the path name now being solved, and provides a new path name to be solved. Thereafter, the step S301 is repeated. If the file corresponding to the file management table entry is not the symbolic link, step S312 prepares for accessing a data storage area according to data storage allocation data contained in the file management table entry. Step S313 selects the next file name to be solved in the entered path name, and the step S304 is repeated.

FIGS. 6A and 6B illustrate examples of fixed length file management table entries employed by the file management system of the present invention, in which FIG. 6A is for files other than a symbolic link, and FIG. 6B for the symbolic link. In FIG. 6B, soft link data in the fixed length file management table entry are a path name that is the contents of the symbolic link and are composed of, for example, a character string of 512 bytes.

FIGS. 7A and 7B illustrate examples of variable length file management table entries employed by the file management system of the present invention, in which FIG. 7A is for files other than a symbolic link, and FIG. 7B for the symbolic link. In FIG. 7B, soft link data in the variable length file management table entry are the length and name of a path contained in the symbolic link and are composed of, for example, a character string of 512 bytes.

The file management table entries may have any structure to contain the soft link data. When the entries have a fixed length as shown in FIGS. 6A and 6B, they may deteriorate the space efficiency of the file management table but the file management table can be easily handled as an array of the entries. The data structure is dependent on system requirements. If the maximum length of a path name allowed by the system as an API function is short, the fixed length data structure will be appropriate. If the entry structure is originally of the variable length or if the maximum length of a path name allowed by the system is long, the variable length data structure of FIGS. 7A and 7B will be appropriate.

Figure 8:
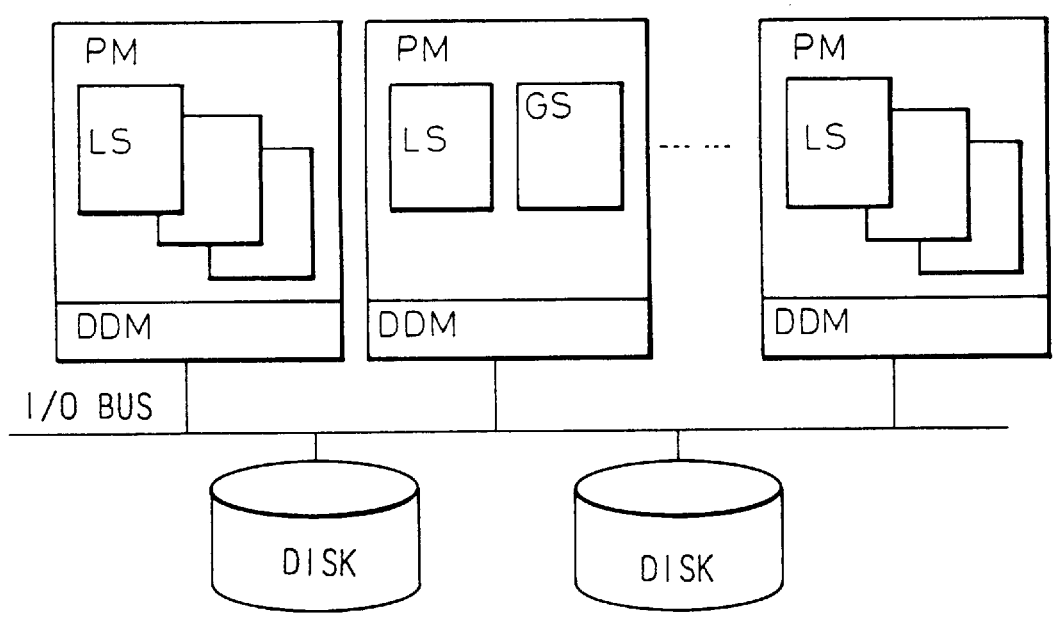
FIG. 8 is a block diagram showing a multiprocessor system realizing the file management system of the present invention.
Figure 9:
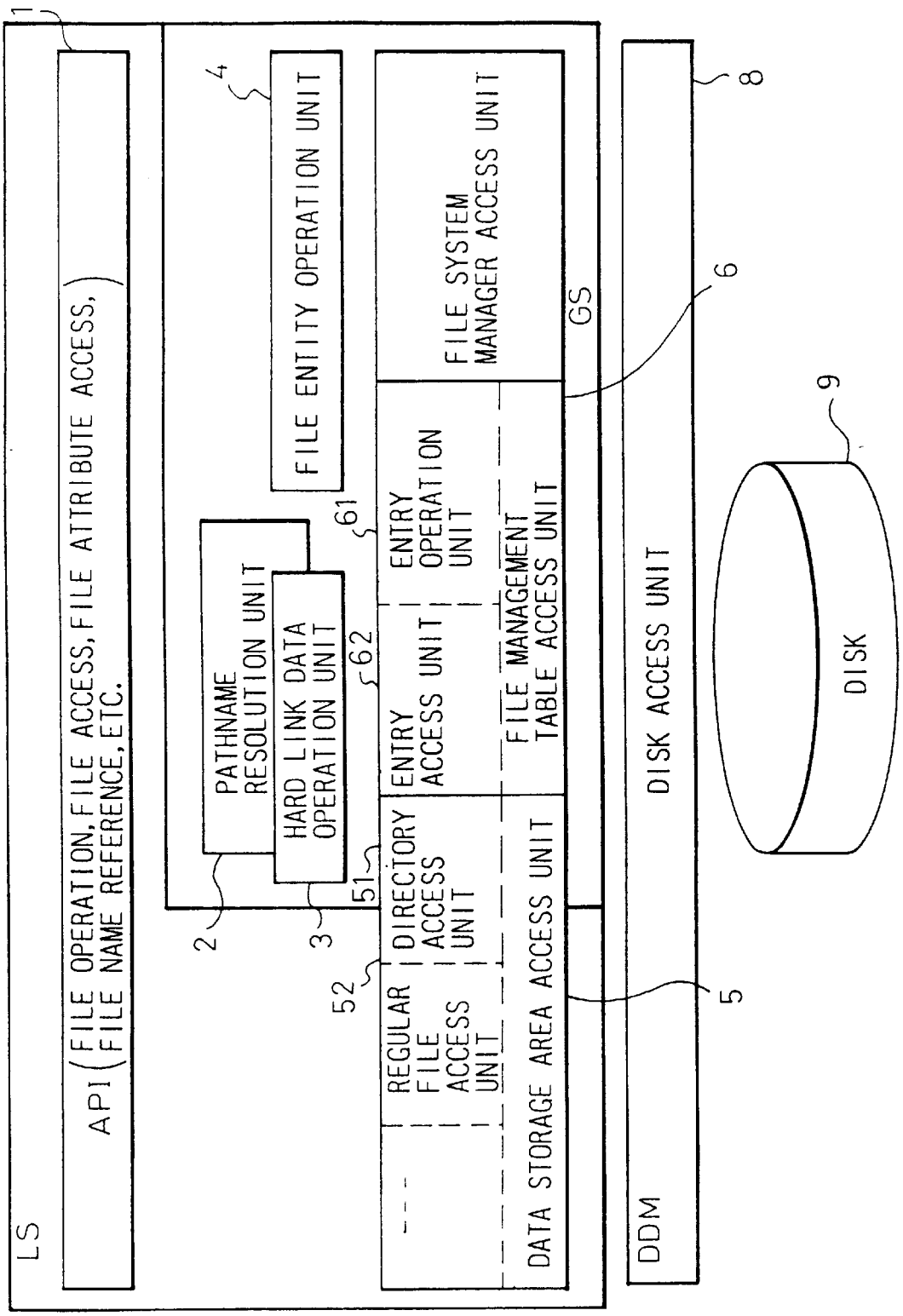
FIG. 9 shows correspondence between components of FIGS. 2 and 8.

FIG. 8 is a block diagram showing a multiprocessor system realizing the file management system of the present invention. FIG. 9 shows correspondence between the units (FIG. 2) of the file management system of the present invention and the components of FIG. 8. In FIGS. 8 and 9, the file management system operates on the multiprocessor system, which is composed of processor modules (PM) each having a CPU and a main memory. This multiprocessor system employs a server-client method.

In FIGS. 8 and 9, PM is the processor module, LS is a local service unit, GS is a global service unit, and DDM is a disk unit manager.

The LS operates in a user space, receives a user request, and according to the request, sends a message to the GS. According to this embodiment, the LS absorbs a protocol of the GS, so that a user receives the service of the GS without knowing the message. To sufficiently operate the multiprocessor system, the LS provides a function of accessing a data storage area in each file system.

The GS occupies a space in the file management system and provides file operation and access services to a user through the LS while maintaining the correctness of each file system. In the GS space, a plurality of threads simultaneously operate to process a plurality of user requests at the same time.

The disk unit manager DDM is provided for each processor module and serves as a kernel. The DDM properly serializes I/O requests occurring in the corresponding processor module. The file management system issues an I/O request with a relative block number in a file system, and the DDM has a function of converting the relative block number into a physical block number.

Figure 10:
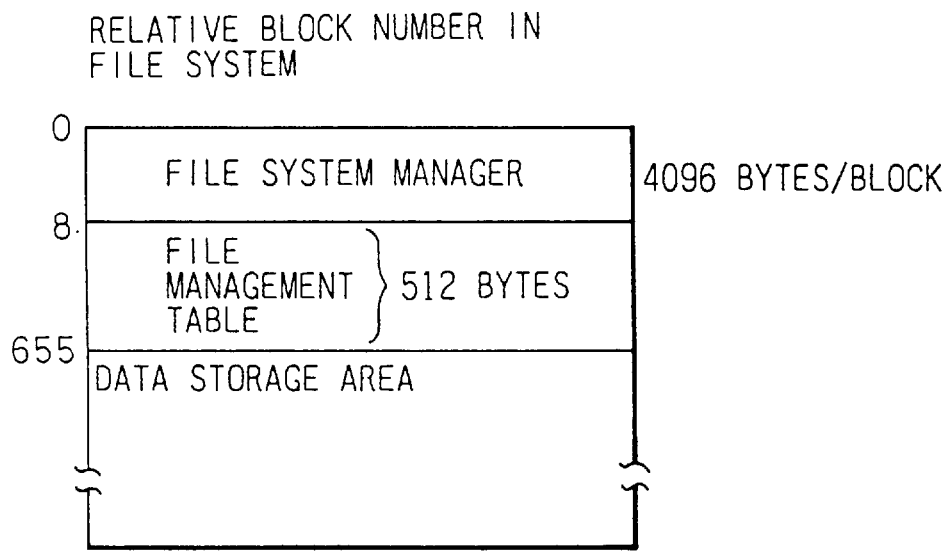
FIG. 10 shows a file system managed by the file management system of the present invention.
Figure 11:
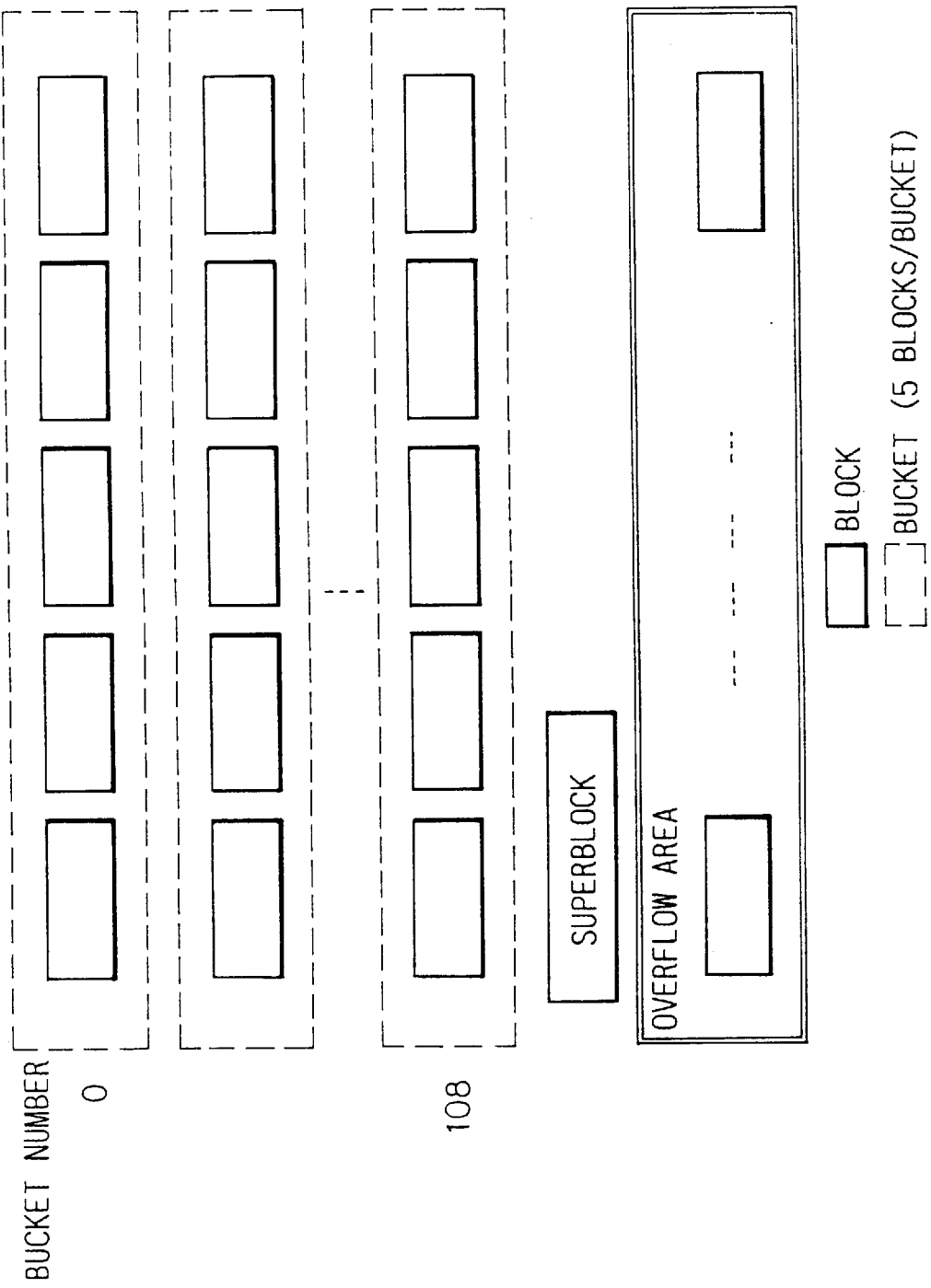
FIG. 11 shows a file management table in the file system.
Figure 12:
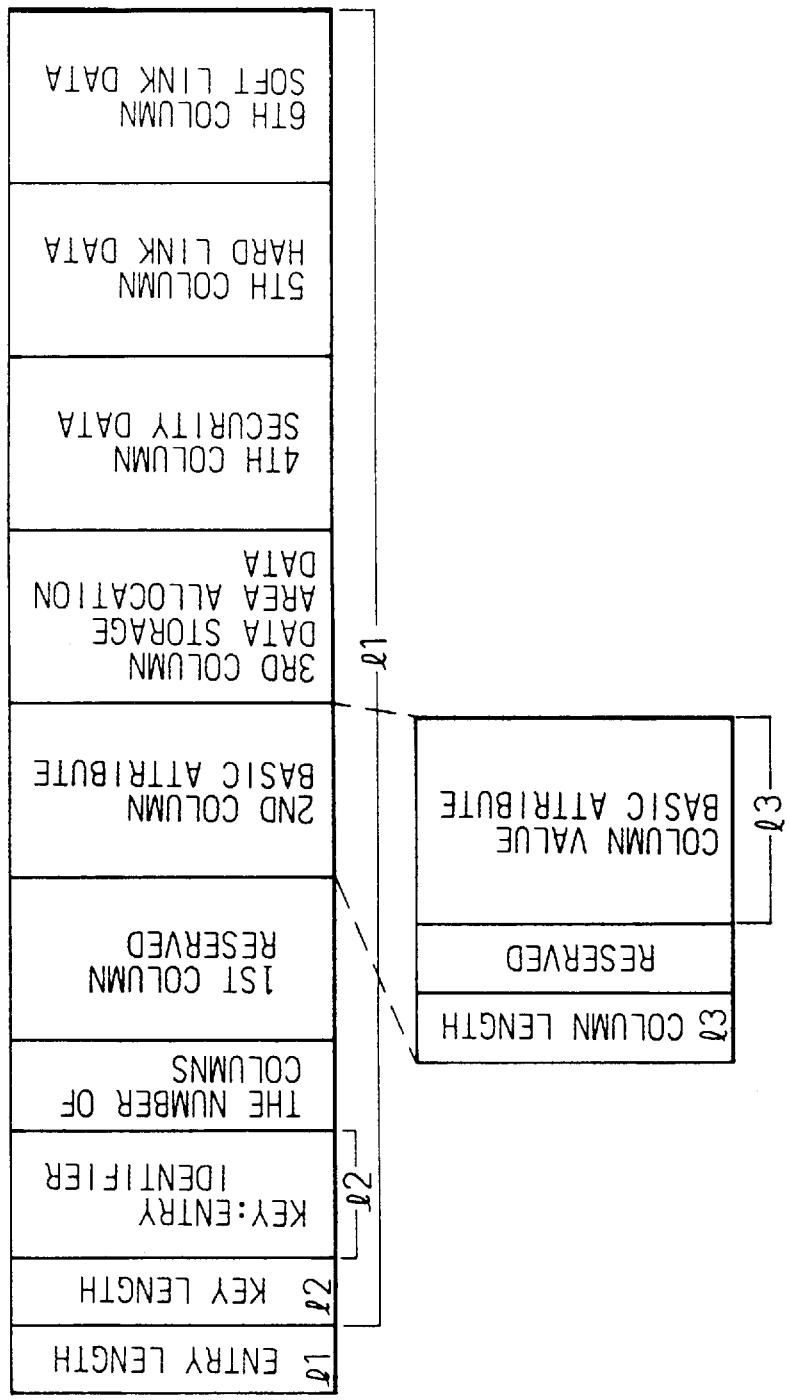
FIG. 12 shows a file management table entry managed by the file management system of the present invention.

FIG. 10 shows an example of a file system managed by the file management system of the present invention, FIG. 11 shows an example of a file management table in the file system, and FIG. 12 shows an example of a file management table entry in the file manager.

The file system is composed of an array of, for example, 4096-byte blocks, the block being a minimum I/O unit handled by the DDM, or a minimum allocation unit in a data storage area of the file system.

In FIG. 10, the file system manager manages the name and size of the file system, file management table allocation data, free block data, and a file management table entry identifier.

In FIG. 11, the file management table has, for example, a hash structure of 109 buckets, which are accessed with the file management table entry identifier as a key. An overflow area is used when an entry overflows from any bucket. The overflow area is managed by data in a superblock. Each bucket contains, for example, five blocks each storing at least one entry.

In FIG. 12, the file management table entry stored optional pieces of variable length data by increasing the number of columns.

In the file management table entry of FIG. 12, a basic attribute indicates a file type, data quantity, last reference time, last update time, last status change time, etc. Data storage allocation data are a variable length array of groups each involving an allocation start relative block number and the number of allocated blocks.

Security data include access permission, an owner identifier, and an owner group identifier. Hard link data include the number of hard links, and for each hard link, a set of (1) an entry identifier representing a hard link managing directory (a parent directory), (2) the name of a file system where the parent directory exists, and (3) a file name managed by the parent directory. Soft link data include a path name that is the contents of a symbolic link. A file other than the symbolic link does not have the sixth column for the soft link, so that it has five columns in total.

FIG. 13 shows an operation of the file management system of the present invention when creating a symbolic link, and FIG. 14 shows an operation of the file management system when deleting a symbolic link. For the sake of simplicity, a user space and the global service unit (GS) operate in the same processor module in FIGS. 13 and 14. The user space and GS may operate in different processor modules. The processor modules for operating the user space and GS are without knowing the spirit of the present invention.

Figure 15A:
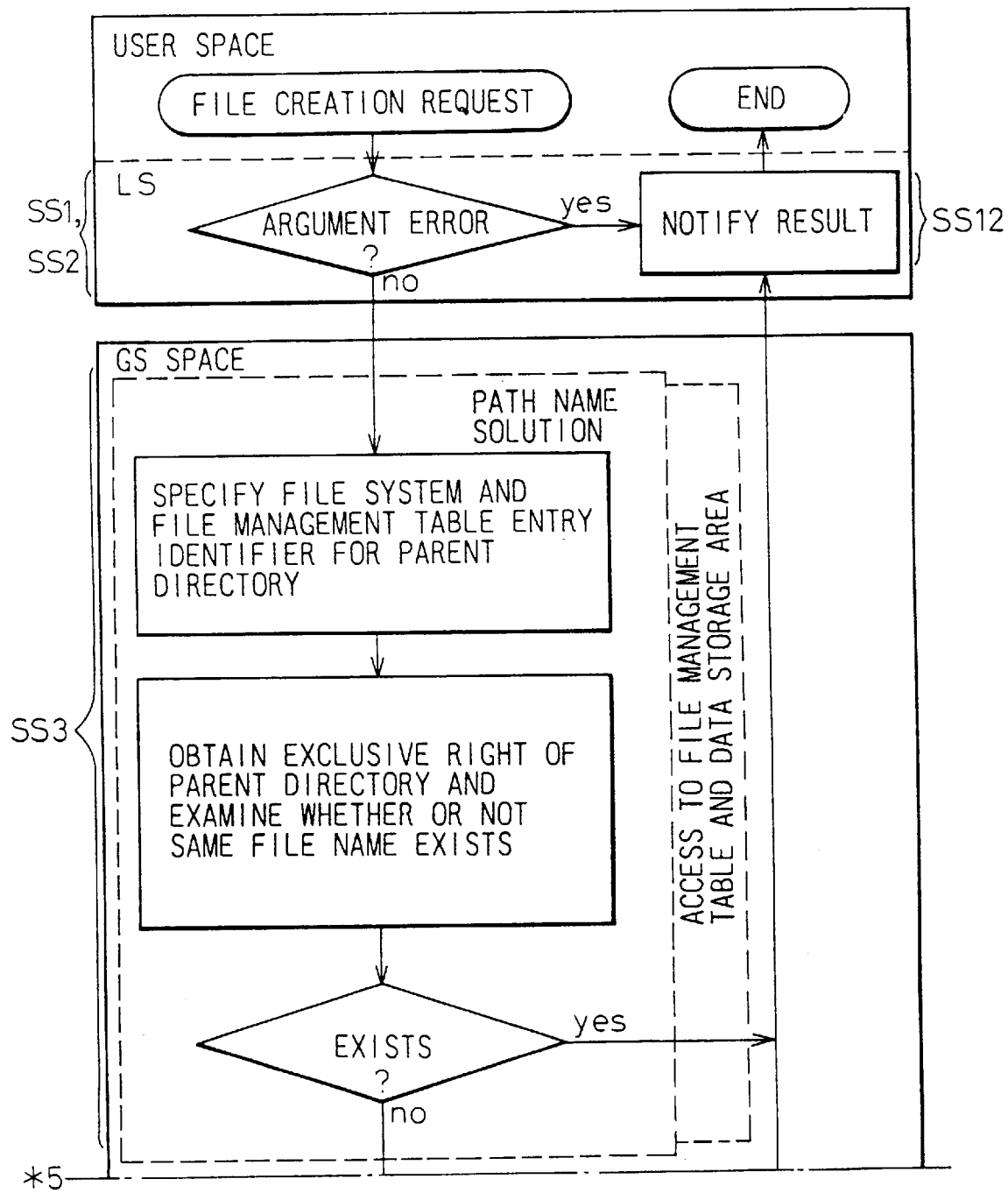
FIGS. 15A and 15B are flowcharts showing steps of creating a file according to another symbolic link process achieved by the file management system of the present invention.
Figure 15B:
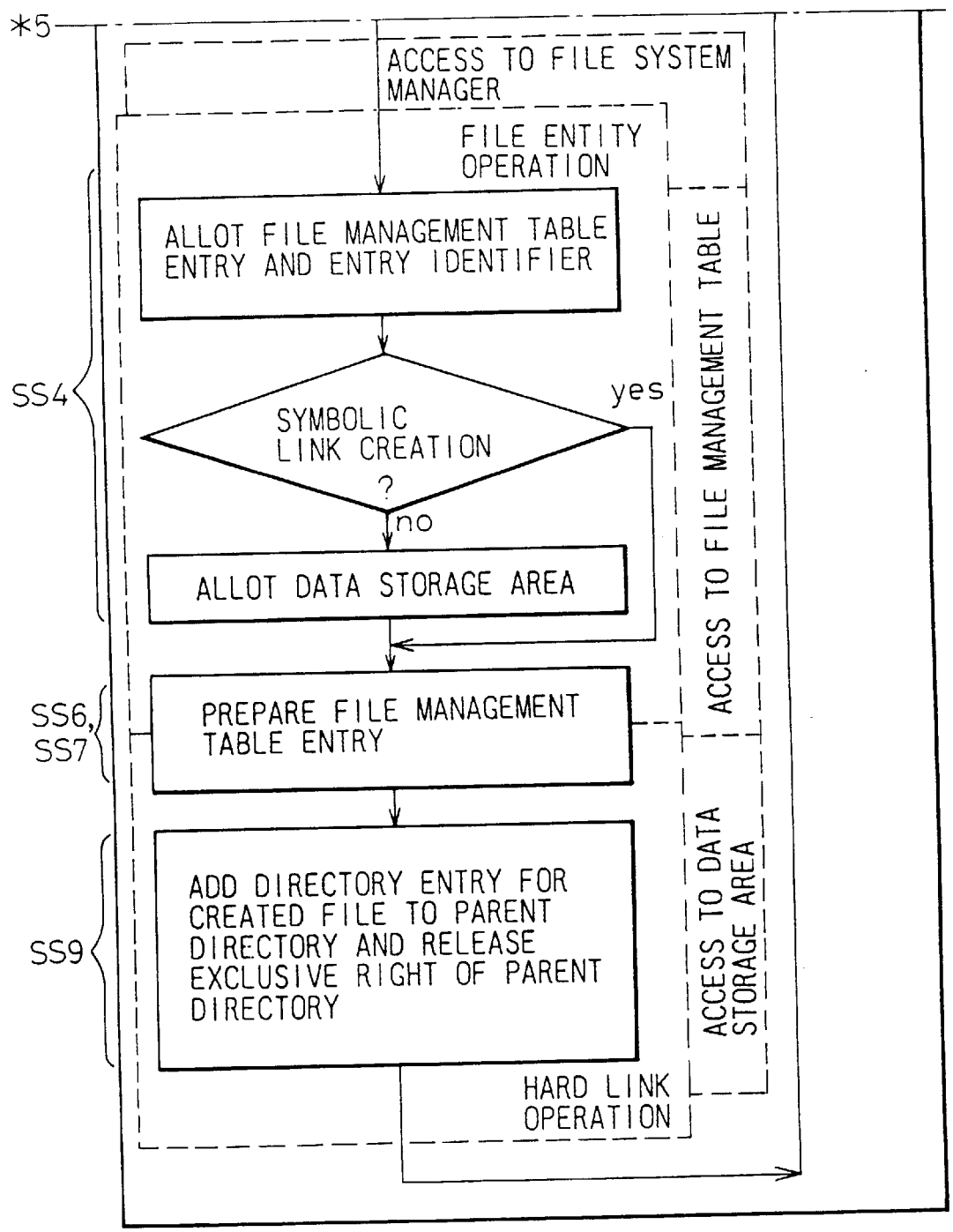
Figure 16A:
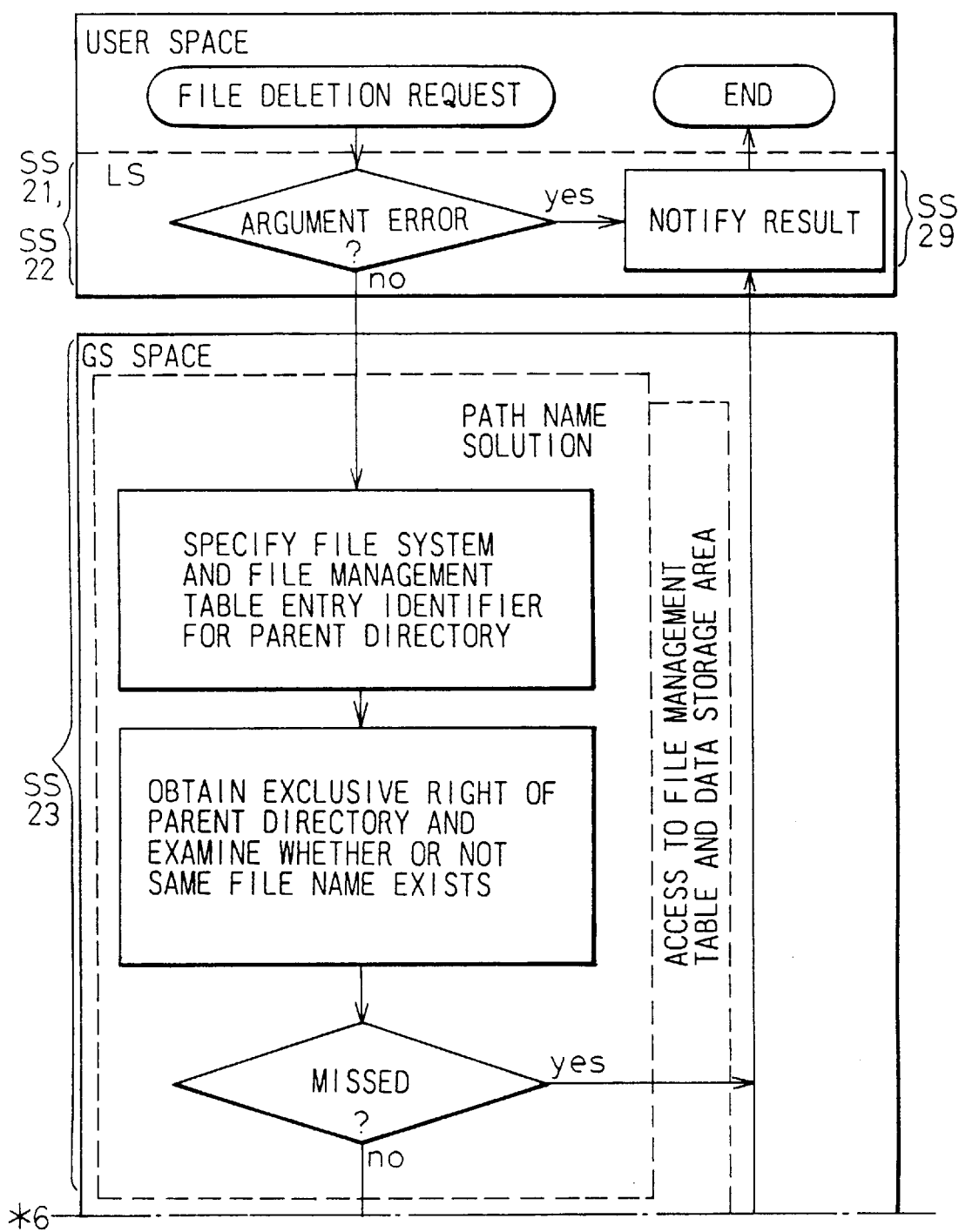
FIGS. 16A and 16B are flowcharts showing steps of deleting a file according to the symbolic link process.
Figure 16B:
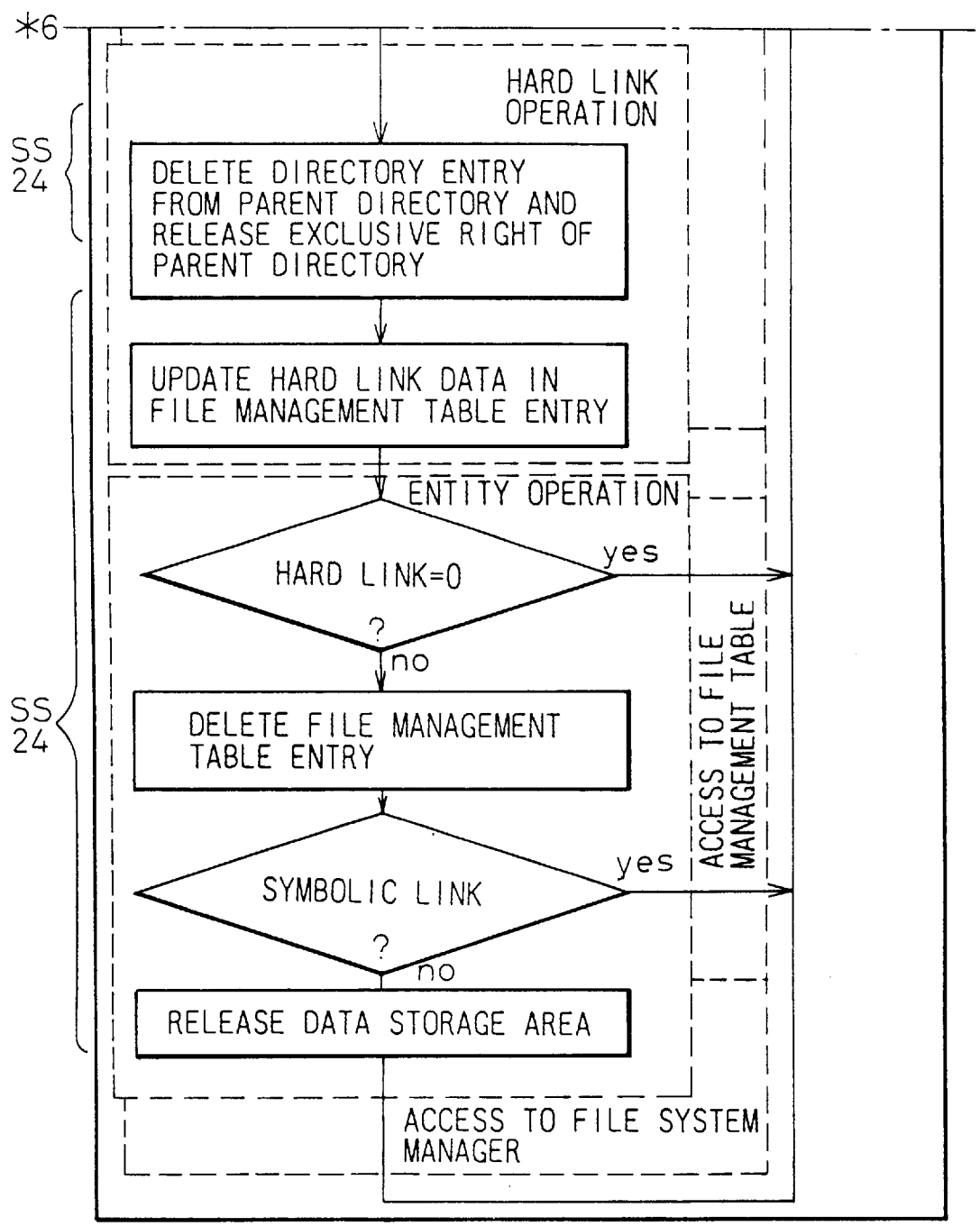
Figure 17B:
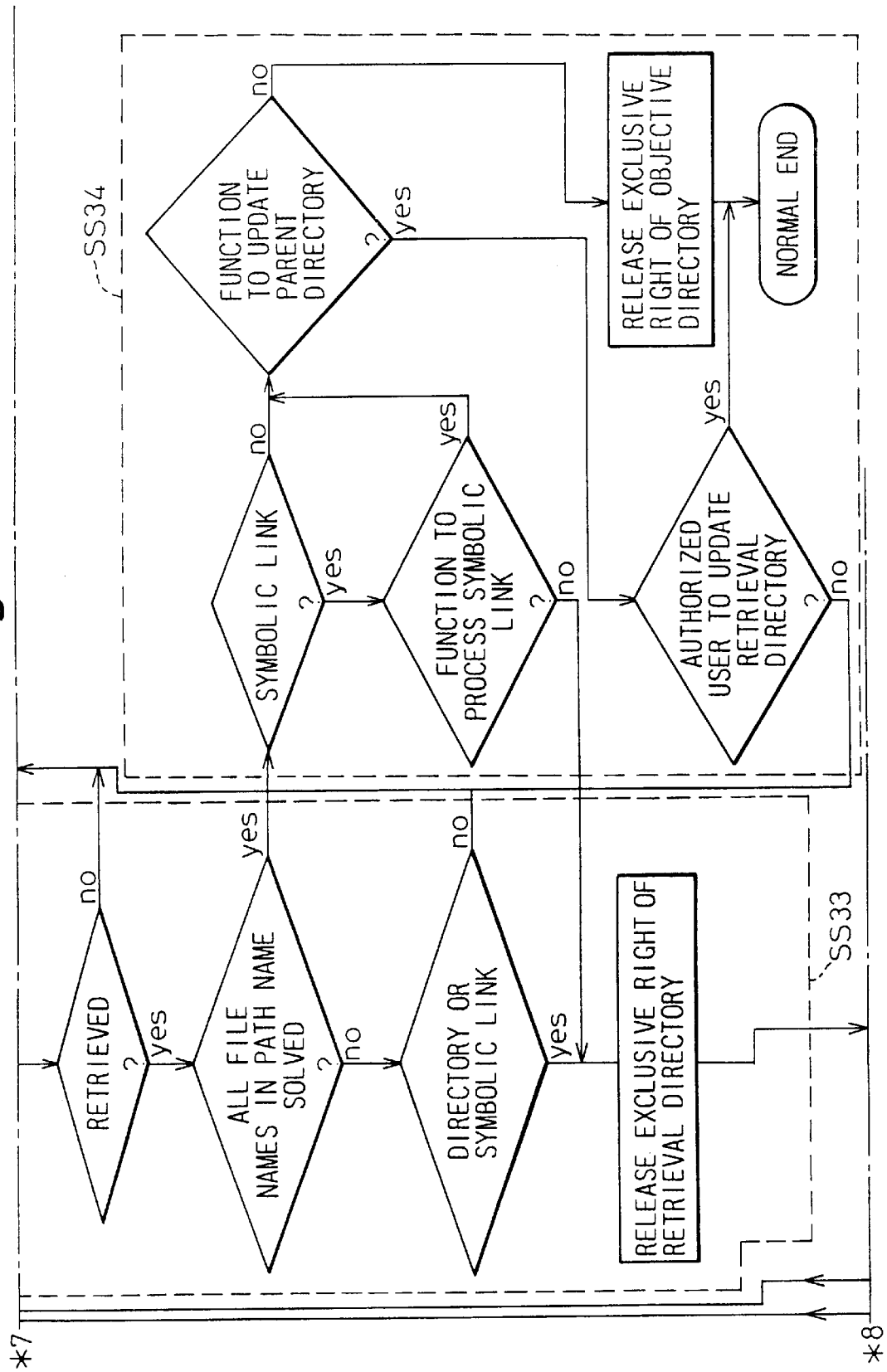
Figure 17C:
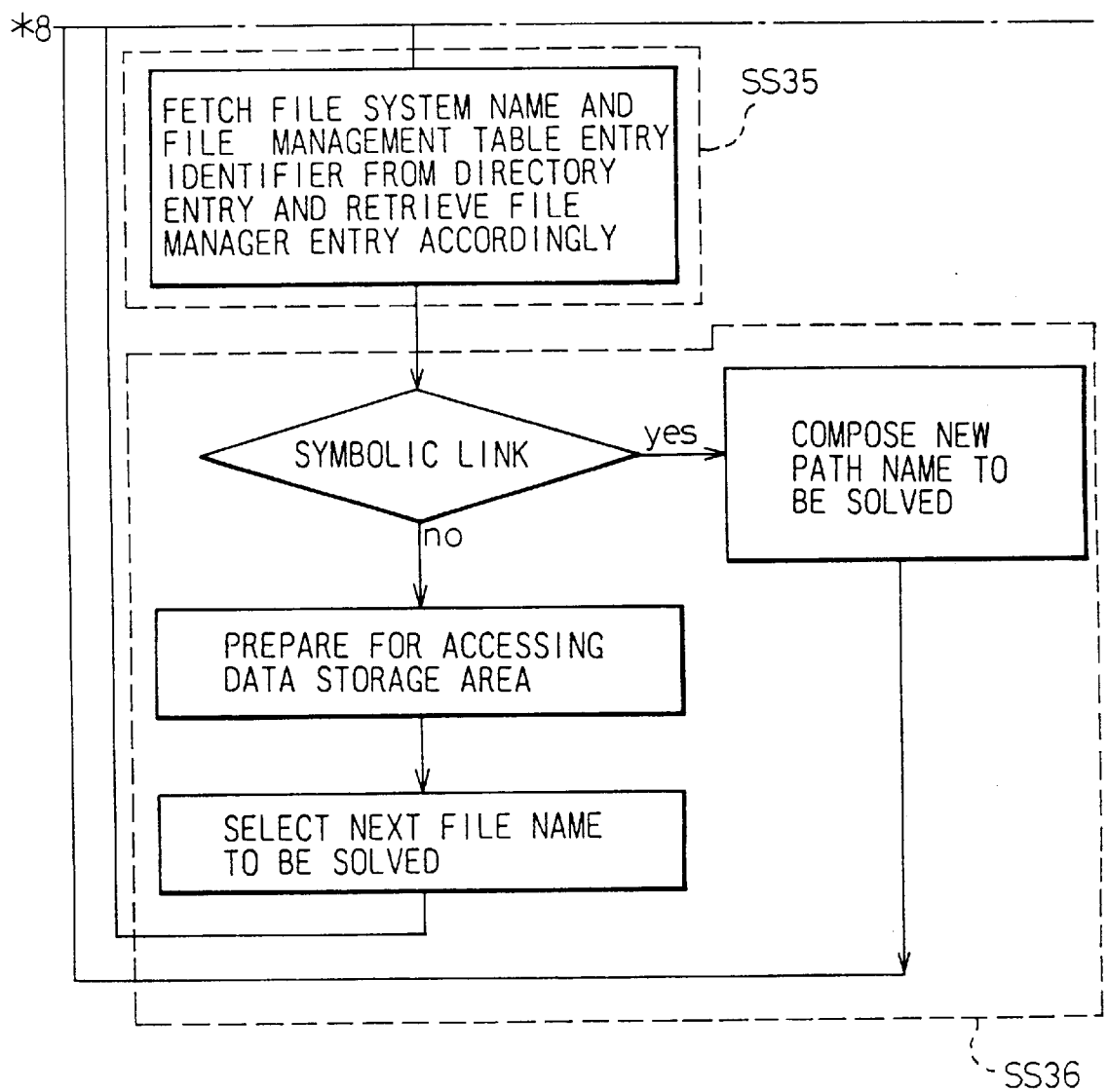

FIGS. 15A and 15B are flowcharts that illustrate the steps of creating a file according to another symbolic link process achieved by the file management system of the present invention, FIGS. 16A and 16B are flowcharts showing steps of deleting a file according to the symbolic link process, and FIGS. 17A to 17C are flowcharts showing pathname resolution steps according to the symbolic link process.

The steps of creating a symbolic link will be explained with reference to FIGS. 13, 15A, and 15B. A user requests the local service unit (LS) to create a symbolic link "x/y" with "b" as its contents. Step SS1 examines whether or not each of the path names "x/y" and "b" is within a path name length allowed by the system, and prepares a message according to a protocol between the LS and GS, to request the GS to create a symbolic link.

The message transmitted from the LS to the GS includes a function code representing the request of creating a symbolic link, security data such as a user identifier and a group identifier, the path name "x/y" of the symbolic link to be created, and the path name "b" that is the contents of the symbolic link.

In step SS2, the LS sends the message prepared in the step SS1 to the GS and waits for a reply. Upon receiving the message from the LS, the GS uses a pathname resolution process to specify the name of a file system where a parent directory of the symbolic link to be created exists and a file management table entry identifier representing the parent directory. The details of this will be explained later.

Since the function code indicates a need to create a symbolic link, step SS3 obtains an exclusive right of the data storage area of the parent directory, so that the parent directory will not be updated by other threads, and at the same time, confirms that there is no directory entry involving the same file name as that of the symbolic link to be created in the parent directory. Step SS4 obtains an exclusive right of a file system manager of the file system where the parent directory exists and allocates a file management table entry identifier to the file to be created.

The entry identifier is an unsigned 4-byte integer, which is prepared whenever a file is created. The file system manager stores the latest entry identifier, which is incremented by one and is allocated to the file to be created. The incremented value is stored as the latest entry identifier in the file system manager. Since a frequently accessed portion of the file system manager is developed in a memory, both the memory and a medium are updated at this time. Once the file system manager is updated, the exclusive right of the file system manager is released.

Step SS6 prepares a file management table entry for the symbolic link according to the format of FIG. 12. Step SS7 divides the entry identifier by the number of buckets (109) and uses the remainder as a hash value to specify a bucket to store the file management table entry. An exclusive right of a file management table of the file system is obtained, and the file management table entry is stored in a free block in the specified bucket. Then, the medium is updated. If the bucket has no free block, the file management table entry is stored in an overflow area. Once the medium is updated accordingly, the exclusive right of the file management table is released.

Step SS9 prepares a directory entry, i.e., a set of the file name "y" of the created symbolic link, the file management table entry identifier, and a file type (symbolic link). At this time, the name of the file system is omitted because the file is created in the file system where the parent directory exists. The directory entry is added to the parent directory specified in the step SS3. When the medium is updated accordingly, the exclusive right of the parent directory is released. This embodiment includes the file type in the directory entry.

Step SS11 notifies the LS of a process result. Step SS12 notifies a user of the process result of the GS through the API (FIG. 9).

In this way, the present invention does not store soft link data related to the symbolic link in the data storage area, to thereby save and/or occupy a block (4096 bytes) of the data storage area. It is not necessary, therefore, to allocate a data storage block to the symbolic link nor change free space data in the file system manager. For these reasons, among others stated hereink, the management system will now be able to read with greater efficiency.

The steps of deleting a symbolic link will be explained with reference to FIGS. 14, 16A, and 16B. A user requests the LS to delete a file "x/y." Step SS21 examines whether or not the path name "x/y" is within the path name length allowed by the system and prepares a message according to the protocol between the LS and GS, to ask the GS to delete a hard link.

The message from the LS to GS includes a function code to request the deletion of the hard link, security data such as a user identifier and a group identifier, and the path name "x/y" of the file to be deleted.

In step SS22, the LS sends the message prepared in the step SS21 to the GS and waits for a reply. Upon receiving the message from the LS, the GS employs the pathname resolution process to specify the name of a file system where the parent directory "x" of the symbolic link to be deleted exists and a file management table entry identifier representing the parent directory. The details of this will be explained later.

Since the function code indicates to delete the hard link, step SS23 obtains an exclusive right of the data storage area of the parent directory, so that the parent directory will not be updated by other threads. The step SS23 confirms that the parent directory has a directory entry corresponding to the file to be deleted, and according to the directory entry, finds the name of a file system where the file to be deleted exists and a file management table entry identifier for the file.

Step SS24 deletes the directory entry from the parent directory and releases the exclusive right of the data storage area of the parent directory. Step SS26 obtains an exclusive right of a file management table of the file system where the file to be deleted exists, and according to the file management table entry identifier, specifies a bucket and block where a corresponding file management table entry exists. The file name and the parent directory managing the file name are deleted from hard link data in the file management table entry, and the number of hard links is decremented by one in the hard link data. If the number of the hard links becomes 0, the file management table entry is deleted from the block. If the file management table entry is for a symbolic link, it has no space in the data storage area, so that the process of releasing the data storage area, i.e., the process of updating the free space data in the file system manager is not carried out.

After these processes, the block where the file management table entry has existed is updated in a medium.

Step SS28 notifies the LS of a process result and informs the user of the result through the API (FIG. 9).

In this way, the present invention does not store soft link data related to a symbolic link in the data storage area, so it is not necessary to release the data storage area nor update the free space data in the file system manager when deleting the symbolic link. The path name resolution process according to the symbolic link process is carried out in the GS, to retrieve directories and symbolic links contained in a given path name and specify the name of a file system where the file specified by the path name exists as well as the file management table entry identifier of the file.

The path name resolution process will be explained with reference to FIGS. 17A to 17C. Step SS31 specifies the name of a file system where a retrieval directory exists and a file management table entry identifier representing the retrieval directory. If the head character of an entered path name is "/," the retrieval directory is a root directory, and if not, it is a current working directory. The names of file systems where the root directory and current working directory exist and the file management table entry identifiers thereof are managed by the file management system.

Step SS32 repeats steps SS33 to SS36 for i=1 to N, where N represents the number of file names contained in the path name.

Step SS33 retrieves a directory entry in the retrieval directory with the "i"th file name in the path name serving as a key. Firstly, the file management table entry identifier representing the retrieval directory is used to find a file management table entry corresponding to the retrieval directory in the file system where the retrieval directory exists. According to security data in the fourth column of the found file management table entry and a user identifier provided by the LS, it is determined whether or not the user is authorized to retrieve the retrieval directory. According to data storage allocation data in the third column of the file management table entry, the data storage area is accessed to retrieve a directory entry of the retrieval directory with the file name serving as a key.

Step SS34 determines whether or not the file in question is a symbolic link, whether or not the symbolic link is an object to be processed, and whether or not the parent directory must be updated. If i=N, the file is not a symbolic link, and the parent directory must be updated, or if i=N, the file is the symbolic link to be processed, and the parent directory must be updated, it is determined whether or not the user is authorized to update the parent directory, and the pathname resolution process ends. Step SS35 extracts a file system name and a file management table entry identifier, and according to these data, retrieves a file manger entry under the extracted file system name.

Step SS36 refers to file attribute data in the file management table entry, to carry out the following processes I to III.

(I) If the file is a directory, a file indicated with the present file management table entry is set as a new retrieval directory, "i" is incremented by 1 to select the next processed file name in the path name, and the step SS33 is repeated.

(II) If the file is a symbolic link, the first to "i"th file names are removed from the path name to be solved, the remnant is combined with a path name stored in the sixth column of the file management table entry, to provide a new path name to be solved, and the step SS31 is repeated.

(III) If the file is not the directory nor the symbolic link, the LS is informed that the file specified by the user has not been found.

In this way, the file management system of the present invention does not allocate a data storage block to soft link data, thereby improving the space efficiency of file systems. This effect of the present invention is more conspicuous in a system employing an I/O architecture with large blocks. The file management system of the present invention refers to the contents of a symbolic link without referring to the data storage area, thereby reducing the number of I/O operations during the pathname resolution process by the number of symbolic links appearing during the pathname resolution process.

Figure 18:
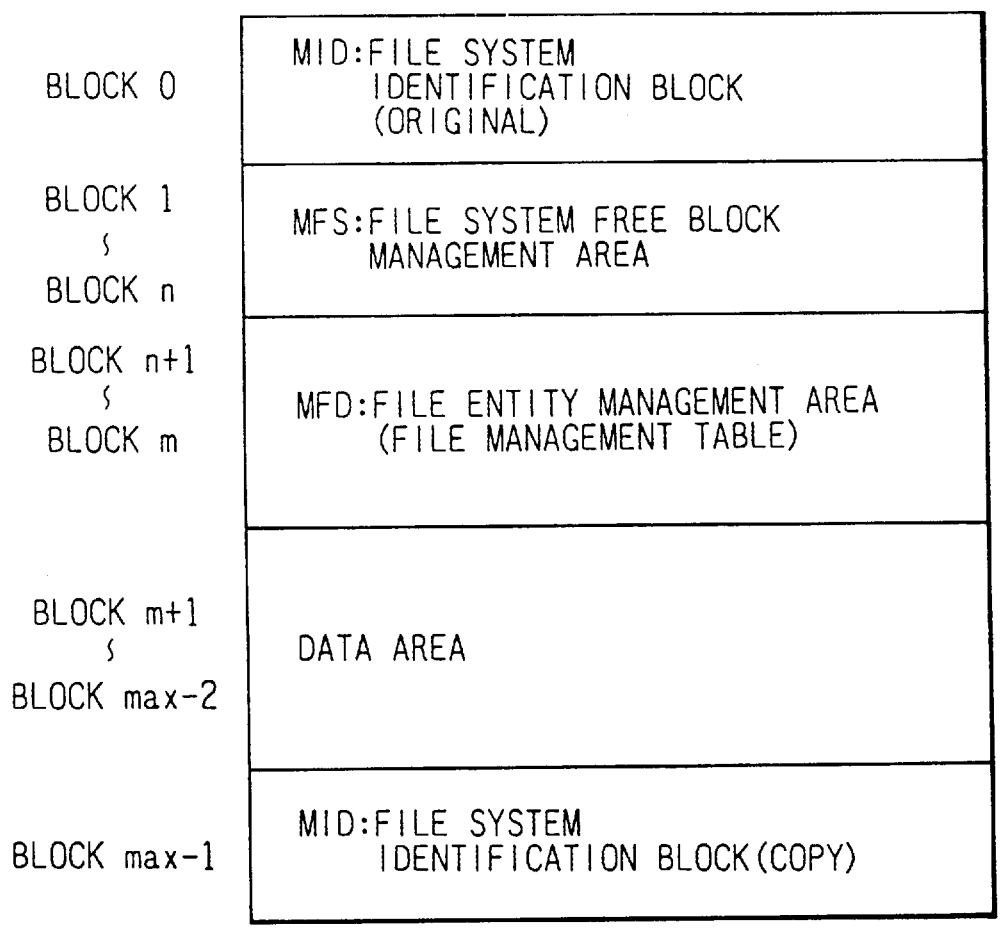
FIG. 18 shows the logic structure of a file system managed by the file management system of the present invention.
Figure 19:
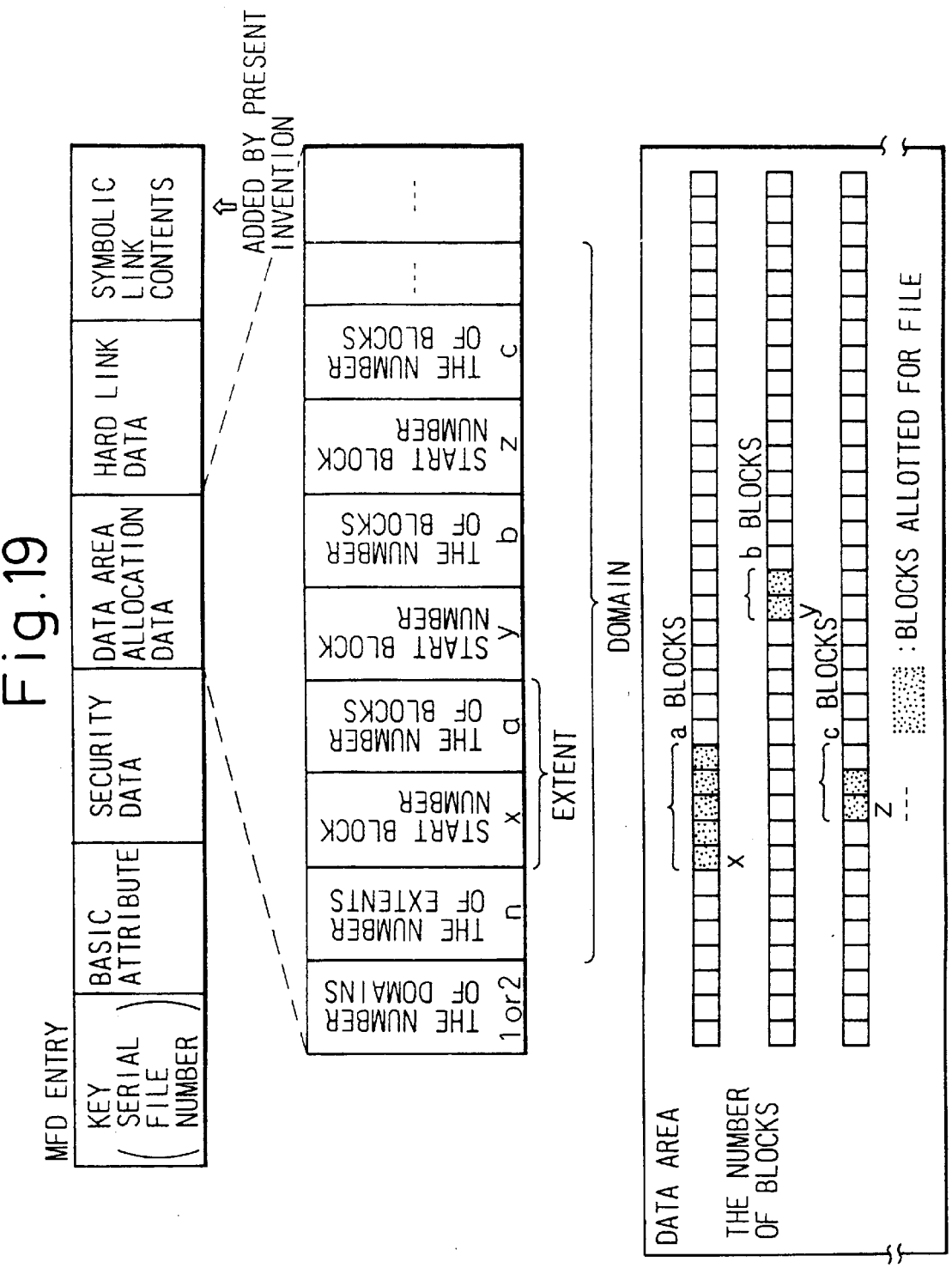
FIG. 19 shows a relationship between an MFD entry and a data area in the file system of FIG. 18.

FIG. 18 shows an example of the logic structure of a file system handled by the file management system of the present invention, and FIG. 19 shows a relationship between an MFD entry and a data area of the file system of FIG. 18. In FIG. 18, the file system is, for example, an SXO file system composed of "max" blocks.

In FIG. 18, blocks 1 to n form a file system free space management area MFS for managing free blocks in the file system. Blocks n+1 to m form a file entity management area, i.e., a file management table. This area is a collection of MFD entries for managing individual files. Each of the MFD entries involves (a) file type (regular file, directory, special file, symbolic link, or FIFO), (b) access time data, (c) security data, (d) data area allocation data (in case of the regular file and directory), (e) the contents of a symbolic link (in case of the symbolic link), and (f) hard link data.

Blocks 0 (original) and max-1 (copy) each form a file system identification area MID for identifying the file system. The area MID contains the name of the file system, data to locate the areas MFS and MFD in the file system, and data for managing unique serial numbers assigned to the files, respectively. The area MID is duplicated for the sake of safety.

In FIG. 18, blocks m+1 to max−2 form a data area to store user file data and the contents of directories. The MFD entries are used to point the data area.

The MFD entry shown in FIG. 19 corresponds to an "inode" in UNIX (registered trade name). To carry out a pathname resolution process to specify an MFD entry/inode according to a given path name, a conventional operating system executes an algorithm explained below. In the algorithm, the MFD entry/inode is referred to as an inode, and a mark "↑" represents a pointer to:

```
{
    parent inode ↑ = NULL; /*firstly solve a current
working directory if a relative path name is given*/
        LOOP_TOP:
    count the number of elements in the path name;
    /*specify a retrieval directory inode*/
    if (absolute path name) {
        retrieval directory inode ↑ = root directory
inode ↑;}
    else if (parent inode ↑ = = NULL) {
        retrieval directory inode ↑ = current working
directory inode ↑;}
    the number of processed path name elements = 0;
    while (the number of processed path name elements <=
the number of path name elements
        and no error) {
        refer (I/O) to the inode and obtain data area
allocation data;
        parent inode ↑ = referred inode ↑;
        switch (file type) {
        directory:
            retrieve a directory entry in a directory data
area with a file name as a key;
            specify an inode from the directory entry;
        break;
        symbolic link:
            refer (I/O) to a symbolic link data area and
obtain a path name contained in the symbolic link.
            combine the obtained path name and the
remaining path name together;
            go to LOOP_TOP;
        break;
        default:
            if (the number of processed path name elements
< the number of path name elements) {
                error detection;
            }
        }
        the number of processed path name elements += 1;
    }
}
```

As described in the underlined part of the above-provided algorithm by way of pseudo-code, the prior art stores a path name that is the contents of a symbolic link in the data area of the file system, and therefore, the stored path name must be referred to through I/O operations. On the other hand, the present invention stores the path name that is the contents of the symbolic link in an "inode" so that the present invention needs no I/O operation to refer to the contents of the symbolic link.

The file management system of the present invention may store data of a file in the file management table, if the quantity of the data is vary small (several tens of bytes to several hundreds of bytes), has an upper limit, and is not updated. Among such files, the present invention is particularly effective to those having severe requirements for access performance. The file management system of the present invention is also applicable to files to be updated. This, however, is not so preferable if the length of entries in the file management table frequently changes, because a process of correcting fragmentation deteriorates the performance of the system.

Figure 20:
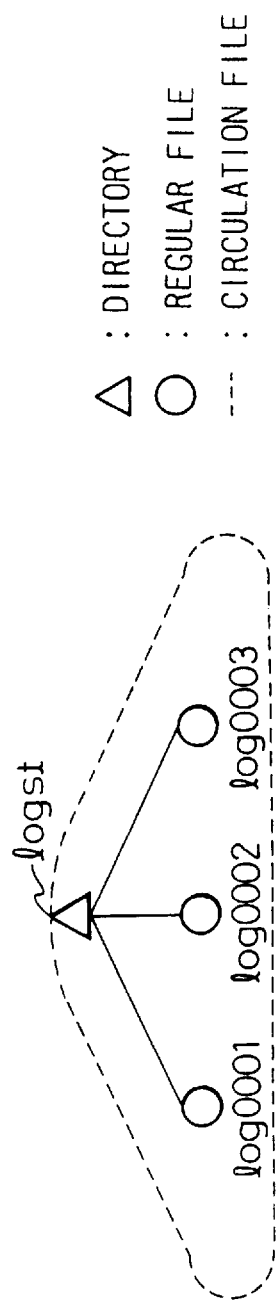
FIG. 20 explains a circulation file managed by the file management system of the present invention.
Figure 21:
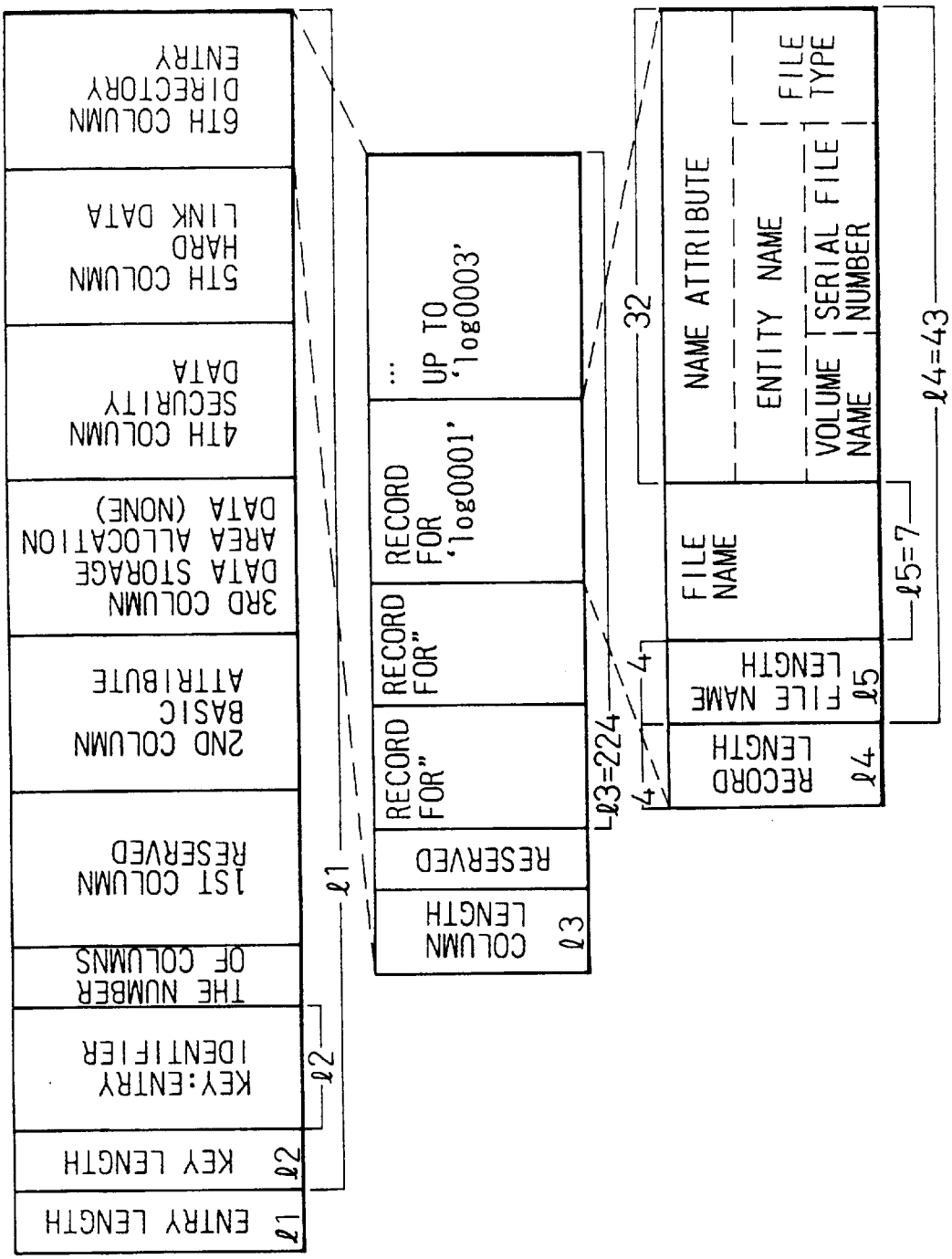
FIG. 21 explains a directory for the circulation file managed by the file management system of the present invention.

FIG. 20 illustrates a circulation file handled by the file management system of the present invention, and FIG. 21 explains a directory of the circulation file handled by the file management system.

The circulation file contains at least two regular files and the directory for managing the names of the files. The directory will not be updated. Data related to the file names stored in the directory are made of several tens of bytes. The contents of the directory may be stored in the file management table instead of the data area, to improve the performance of creating, opening, and switching the circulation file and to save disk space.

In the circulation file of FIG. 20, each file is identified with a directory path name, and the names (log0001, log0002, . . . ) of the regular files controlled by the directory are determined by the system according to a naming protocol. The circulation file of FIG. 20 is used to add and accumulate data such as logs.

The file management system writes data provided by a user into a current file. The current file is a presently accessible file among the files log0001 to log0003. When the current file becomes full, it is switched to another according to fixed order. The user backs up the contents of the regular files other than the current file.

FIG. 22 shows the effect of the file management system of the present invention when storing logs of file systems. When creating a file, the file management system of the present invention is capable of reducing the number of I/O operations by "n+2," where n is the number of regular files. Namely, the present invention reduces the number of I/O operations for adding directory entries. When opening/switching the log files, the present invention is capable of reducing the number of I/O operations by one for reading a directory data area.

In this case, the present invention reduces a disk space occupied by a directory from the space of a file management table plus data area (12 kilobytes) down to the space of a file management table plus (n+2)×48 bytes (about). The 48 bytes (about) correspond to an average file name length plus name attribute length.

In this way, the file management system of the present invention reduces the number of I/O operations when applied to store logs of file systems compared with the prior art.

As explained above in detail, the file management system according to the present invention does not allocate data storage blocks to soft link data, to thereby improve the space efficiency of file systems. This effect is conspicuous in a system employing an I/O architecture with large blocks. In addition, the file management system of the present invention refers to the contents of a symbolic link without referring to a data storage area, to thereby reduce the number of I/O operations during the pathname resolution process by the number of symbolic links contained in a given path name.

Many different embodiments of the present invention may be constructed without departing from the spirit and scope of the present invention, and it should be understood that the present invention is not limited to the specific embodiments described in this specification, except as defined in the appended claims.

I claim:

1. A file management system, comprising:

disk access means for converting a relative position of a block of a file system into a physical position and accessing data at said physical position in a disk;

file entity operation means for updating free block data in said file system when creating and deleting a file entity;

file system manager access means for defining a data structure of said file system using a file system manager and for providing access by said file entity operation means to said file system manager independently of the data structure; and a file management table access unit to provide an interface to said file system manager access means, said file management table access unit having entry operation means for allocating and releasing file management table entries, and entry access means for referring to and updating the file management table entries and for extracting symbolic link data including a path name out of any one of said file management table entries.

2. A file management system as claimed in claim 1, wherein said file management system further comprises identifier producing means for producing file system entry identifiers;

wherein said entry access means is directly or indirectly used by said identifier producing means, to provide the contents of a file management table entry corresponding to an entry identifier specified by said identifier producing means independently of the data structure of said file management table entry, to provide data independently of the data structure of said file management table entries is received, said received data according to the data structure of said file management table entries is processed, and one of said file management table entries according to the processed data is updated; and wherein said entry operation means is used by said file entity operation means, to prepare a file management table entry and notify said identifier producing means of an entry identifier unique to said prepared file management table entry, as well as releasing a file management table entry corresponding to an entry identifier provided by said identifier producing means.

3. A file management system as claimed in claim 2, wherein said identifier producing means comprises an application program interface, pathname resolution means for resolving path names, and link data operation means for determining a relative location of data; and wherein said entry access means is directly or indirectly used by said application program interface, said path name resolution means, and said link data operation means.

4. A file management system as claimed in claim 3, wherein said file management system further comprises data storage area access means for accessing a data storage area, said data storage area access means having directory access means for referring to, updating, deleting, and adding directory entries, and regular file access means for referring to and updating data of regular files;

wherein said link data operation means uses said directory access means and said entry access means, to refer to, update, add, and delete link data while maintaining the correspondence of the link data in a directory and a file management table entry;

wherein said path name resolution means uses said directory access means and said entry access means, to specify a file according to a given path name, link data, and the path name included in the symbolic link data; and wherein said file entity operation means allocates and releases file management table entries while correctly maintaining a relationship between file system free block data in said file system manager and allocation data in the file management table entries.

5. A file management system as claimed in claim 1, wherein said file system manager of each file system holds data for indicating whether said file system is new or old, and said file management system has logic for determining a position to store file access information according to the data indicating whether said file system is new or old, to thereby support old and new media.

6. A file management method of a computer, comprising the steps of:

storing symbolic link data including a path name related to a file, in a file management table pointed to by a directory entry of a computer file management system, the path name providing a symbolic link to specify another directory entry in the computer file management system; and managing the file in the computer according to the symbolic link data.

7. A file management method as claimed in claim 6, wherein said file management method is applied to manage data of files.

8. A file management method as claimed in claim 7, wherein said file management method is applied to manage circulation files.

9. A file management method as claimed in claim 6, wherein said computer file system is managed by a file management system comprising:

disk access means for converting the relative position of a block in said file system into a physical position and accessing data at said physical position in a disk:

file entity operation means for updating free block data in said file system when creating and deleting a file entity;

file system manager access means for defining a data structure of said file system using a file system manager and for providing access by said file entity operation means said file system manager independently of the data structure; and a file management table access unit having entry operation means for allocating and releasing file management table entries, and entry access means for referring to and updating the file management table entries and for extracting symbolic link data out of any one of said file management table entries.

10. A file management method as claimed in claim 9, wherein said file management system further comprises identifier producing means for producing file system entry identifiers;

wherein said entry access means is directly or indirectly used by said identifier producing means, to provide the contents of a file management table entry corresponding to an entry identifier specified by said identifier producing means independently of the data structure of said file management table entry, data without knowing the data structure of said file management table entries is received, said received data according to the data structure of said file management table entries is processed, and one of said file management table entries according to the processed data is updated; and wherein said entry operation means is used by said file entity operation means, to prepare a file management table entry and notify said identifier producing means of an entry identifier unique to said prepared file management table entry, as well as releasing a file management table entry corresponding to an entry identifier provided by said identifier producing means.

11. A file management method as claimed in claim 10, wherein said identifier producing means comprises an application program interface, path name resolution means for resolving path names, and link data operation means for determining a relative location of data; and wherein said entry access means is directly or indirectly used by said application program interface, said path name resolution means, and said link data operation means.

12. A file management method as claimed in claim 11, wherein said file management system further comprises a data storage area access means for accessing a data storage area, said data storage area access means having directory access means for referring to, updating, deleting, and adding directory entries, and regular file access means for referring to and updating data of regular files;

wherein said link data operation means uses said directory access means and said entry access means, to refer to, update, add, and delete link data while maintaining the correspondence of the link data in a directory and a file management table entry;

wherein said pathname resolution means uses said directory access means and said entry access means, to specify a file according to a given path name, link data, and file access information; and wherein said file entity operation means allocates and releases file management table entries while correctly maintaining a relationship between file system free block data in said file system manager and allocation data in the file management table entries.

13. A file management method as claimed in claim 9, wherein said file system manager of each file system holds data for indicating whether said file system is new or old, and said file management system has logic for determining a position to store the symbolic link data file access information according to the data indicating whether said file system is new or old, to thereby support old and new media.

* * * * *